US008934544B1

(12) United States Patent
Wang

(10) Patent No.: US 8,934,544 B1
(45) Date of Patent: Jan. 13, 2015

(54) EFFICIENT MOTION ESTIMATION IN HIERARCHICAL STRUCTURE

(75) Inventor: Yunqing Wang, Schenectady, NY (US)

(73) Assignee: Google Inc., Mountain View, CA (US)

( * ) Notice: Subject to any disclaimer, the term of this patent is extended or adjusted under 35 U.S.C. 154(b) by 315 days.

(21) Appl. No.: 13/457,454

(22) Filed: Apr. 26, 2012

Related U.S. Application Data

(60) Provisional application No. 61/548,197, filed on Oct. 17, 2011.

(51) Int. Cl.
*H04N 7/22* (2006.01)

(52) U.S. Cl.
USPC .................................................. 375/240.13

(58) Field of Classification Search
CPC ............ H04N 19/006; H04N 19/0066; H04N 19/00684; H04N 19/00018; H04N 19/00127; H04N 19/00321; G06T 7/2026
USPC .................................................. 375/240.13
See application file for complete search history.

(56) References Cited

U.S. PATENT DOCUMENTS

| | | | | |
|---|---|---|---|---|
| 5,477,272 A * | 12/1995 | Zhang et al. | ............. | 375/240.06 |
| 6,351,563 B1 * | 2/2002 | Kim et al. | ..................... | 382/232 |
| 2002/0196854 A1 * | 12/2002 | Kim | ......................... | 375/240.17 |
| 2006/0133500 A1 * | 6/2006 | Lee et al. | ................. | 375/240.16 |
| 2006/0188024 A1 * | 8/2006 | Suzuki et al. | ............. | 375/240.23 |
| 2008/0267291 A1 * | 10/2008 | Vieron et al. | ............. | 375/240.16 |

OTHER PUBLICATIONS

"Hierarchical Motion Estimation Algorithm Based on Pyramidal Successive Elimination", to Lin et al. Computer Symposium 1998, Oct. 1998.*
Tourapis, Alexis M., et al., "Fast Motion Estimation Using Modified Circular Zonal Search," 4 pages, Department of Electrical and Electronic Engineering, The Hong Kong University of Science and Technology, Clear Water Bay, Kowloon, Hong Kong.
Cosman, Pamela C., "Video Compression Fundamentals," 57 pages.
"Introduction to Video Coding," Mozilla, http://people.xiph.org/~tterribe/pubs/lca2012/auckland/intro_to_video1.pdf, 171 pages, Last accessed May 1, 2012.

(Continued)

*Primary Examiner* — Tung Vo
*Assistant Examiner* — Mohammed Rahaman
(74) *Attorney, Agent, or Firm* — Young Basile Hanlon & MacFarlane P.C.

(57) ABSTRACT

Techniques for coding of video content are presented. An encoder component generates a down-sampled image(s) of a video frame of a video frame sequence to form a multi-resolution level video structure. Using a fast motion estimation algorithm, the encoder component performs motion estimation on a lowest-resolution image, propagates estimation results to the next-higher resolution level. The encoder component uses those estimation results, and/or spatial information of previous encoded macroblocks of the next-higher resolution image, as a prediction for motion estimation performed on the next-higher resolution image. The encoder component applies mode selection and motion search rules, and calculates and uses dissimilarity values of macroblocks, to facilitate prediction for motion estimation at the next-higher resolution level. The encoder component can continue this motion estimation process for another higher-resolution image(s) of the structure up through the original image.

27 Claims, 12 Drawing Sheets

(56) References Cited

OTHER PUBLICATIONS

Li & Drew, "Basic Video Compression Techniques," Fundamentals of Multimedia, 2003, 31 pages, Chapter 10, Prentice Hall.

Wu, Bing-Fei, et al., "Efficient Hierarchical Motion Estimation Algorithm and Its VLSI Architecture," IEEE Transactions on Very Large Scale Integration (VLSI) Systems, Oct. 2008, pp. 1385-1398, vol. 16, No. 10.

* cited by examiner

US 8,934,544 B1

EFFICIENT MOTION ESTIMATION IN HIERARCHICAL STRUCTURE

CROSS-REFERENCE TO RELATED APPLICATIONS

This application claims the benefit of U.S. Provisional Application No. 61/548,197, filed Oct. 17, 2011 and entitled "EFFICIENT MOTION ESTIMATION IN HIERARCHICAL STRUCTURE", the entirety of which is incorporated herein by reference.

TECHNICAL FIELD

This disclosure relates generally to video processing, and more specifically to efficient motion estimation in hierarchical structure.

BACKGROUND

The amount of data representing media information, such as a still image and video image, can be extremely large. Further, transmitting digital video information over communication networks can consume large amounts of bandwidth. The cost of transmitting data from one location to another can be a function of number of bits transmitted per second. Typically, higher bit transfer rates are associated with increased cost. Higher bit rates also progressively can progressively add to required storage capacities of memory systems, which can thereby increase storage cost. Thus, at a given quality level, it can be much more cost effective to use fewer bits, as opposed to more bits, to store digital images and videos. It therefore can be desirable to compress media data for recording, transmitting, or storing.

For a typical compression scheme, achieving higher media quality can require that more bits used, which can, in turn, increase cost of transmission and storage. While lower bandwidth traffic may be desired so may higher quality media.

An encoder is a device capable of encoding (e.g., coding), and sometimes also decoding, digital media data. A decoder is a device capable of decoding digital media data. A codec is a device capable of coding and/or decoding digital media data. The term codec is derived from a combination of the terms code and decode, or the terms compress and decompress. A variety of codecs are commercially available. Codec classifications can include, for example, discrete cosine transfer codecs, fractal codecs, and wavelet codecs. An encoder or codec, by encoding the digital media data, can reduce the number of bits required to transmit signals, which can thereby reduce associated transmission costs.

One part of the encoding process typically involves using motion estimation to facilitate encoding of digital media data. In most cases, consecutive video frames in a sequence of video frames will be relatively similar except for the movement of an object(s) within a frame from one video frame to the next video frame. Motion estimation techniques can take advantage of similarities between consecutive video frames to more efficiently encode a video frame. For instance, an encoder, employing a motion estimation technique, can use a previous video frame as a reference when encoding a current video frame. The encoder can generate motion vectors for the current video frame based on the previous video frame, which typically is a reconstructed video frame. The encoder can identify differences between the reference video frame and current video frame, and can code the portions of the current video frame that are different from the reference video frame, without having to code the portions of the current video frame that are unchanged from the reference video frame. This can thereby make the encoding process and decoding process more efficient.

Precise motion estimation in video compression can be desirable to attain desired quality and efficiency of the video encoder. Typically, the more precise the motion estimation, the less complicated residual data can be for encoding of video content, the lower the bit rate, and the better the encoding quality.

However, motion estimation is one of if not the most computing intensive part of the video encoding process. The computational complexity of motion estimation generally can be very high (e.g., up to 30% or 40% of encoding time), which can thereby make motion estimation a primary time-consuming part in a video encoder.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems, methods, computer program products, and techniques disclosed herein relate to encoding video. Disclosed herein is a system that encodes an original video frame of a video frame sequence. The system can include an estimator component configured to generate a first motion estimation for a first down-sampled video frame associated with the original video frame, and generate at least one other motion estimation for at least one of the original video frame or a second down-sampled video frame associated with the original video frame based at least in part on information relating to the motion estimation of the first down-sampled video frame and whether the parent macroblock is identified as inter mode or intra mode, to facilitate the encoding of the original video frame, wherein the parent macroblock corresponds to a current macroblock of the at least one of the original video frame or the second down-sampled video frame. The system also can include a coder component configured to perform one or more encoding functions on the video frame sequence using the at least one other motion estimation or information derived from the at least one other motion estimation.

Also disclosed herein is a method for encoding an original video frame. The method includes employing at least one processor to facilitate execution of code instructions retained in at least one memory device. The at least one processor, in response to execution of the code instructions, performs acts including: performing a first motion estimation on a first down-sampled video frame associated with the original video frame of a sequence of video frames; and performing at least one other motion estimation on at least one of the original video frame or a second down-sampled video frame associated with the original video frame based at least in part on information relating to the motion estimation of the first down-sampled video frame and whether a parent macroblock associated with the first down-sampled video frame that is inter mode or intra mode, wherein the parent macroblock corresponds to a current macroblock that is associated with the at least one of the original video frame or the second down-sampled video frame.

Further disclosed herein is a computer program product. The computer program product includes a computer-readable storage medium storing computer-executable instructions that, in response to execution, cause a system including at least one processor to perform operations. The operations include generating a first motion estimation on a first down-sampled video frame associated with the original video frame of a sequence of video frames. The operations further include generating at least one other motion estimation on at least one of the original video frame or a second down-sampled video frame associated with the original video frame based at least in part on information relating to the motion estimation of the first down-sampled video frame and whether a parent macroblock associated with the first down-sampled video frame is inter mode or intra mode, wherein the parent macroblock corresponds to a current macroblock that is associated with the at least one of the original video frame or the second down-sampled video frame.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Figure 1:
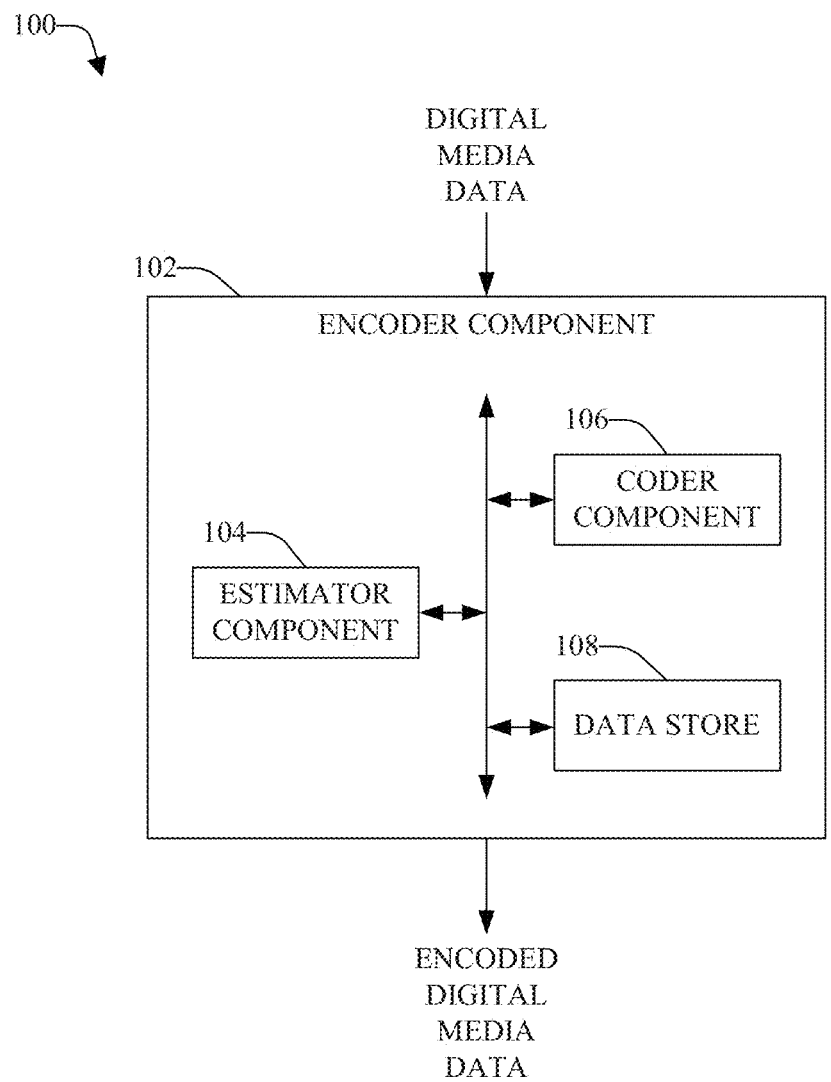
FIG. 1 illustrates a block diagram of an example system that can efficiently encode digital media data in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Motion estimation is often used to facilitate encoding digital media data (e.g., video content). During the motion estimation process, motion vectors for a current raw video frame of a video frame sequence can be generated based on a reference video frame, which is typically a prior video frame in the sequence. Precise motion estimation in video compression can be desirable to attain desired quality and efficiency of the video encoder. Typically, the more precise the motion estimation, the less complicated residual data can be for encoding of video content, the lower the bit rate, and the better the encoding quality. However, motion estimation is one of the most, if not the most, computing intensive part of the video encoding process. The computational complexity of motion estimation generally can be very high (e.g., up to 30% or 40% of encoding time), thereby making motion estimation a primary time-consuming part in a video encoder.

Techniques for efficient coding of digital media data using a fast motion estimation algorithm in relation to a multi-level hierarchical video structure are presented. An encoder can include an estimator component that can generate a multiple-level (also referred to herein as "multi-level") hierarchical video structure relating to a video frame of a video frame sequence. The estimator component can generate one or more down-sampled images of the video frame having one or more respective resolution levels to form the multi-level hierarchical video structure. The estimator component can use a fast motion estimation algorithm with the multi-level hierarchical video structure to increase the rate (e.g., speed) for performing motion estimation of the video frame associated with the structure. The fast motion estimation algorithm can include aspects relating to calculating a dissimilarity level of a macroblock associated with an image of the video frame (e.g., down-sampled image or original image of the video frame) and using motion information relating to multiple resolution levels of the multi-level hierarchical video structure to facilitate deriving high-precision predictions relating to motion estimation. The fast motion estimation algorithm also can include aspects relating to applying or enforcing a set of rules (e.g., mode selection and motion search rules) in relation to the encoding-related information (e.g., information relating to motion estimation for the video frame). The set of rules can include general purpose rules and/or application-specific rules (e.g., rules relating to video-conferencing applications). The fast motion estimation algorithm, employing such aspects, can thereby facilitate efficient generation of motion estimation for the video frame.

To facilitate generating an unbiased prediction, the estimator component can use existing motion information from a current resolution level (e.g., spatial predictor on a current resolution image of a video frame) and the immediate lower-resolution level image of the video frame. The estimator component can calculate the dissimilarity level of a macroblock of an image of the multi-level hierarchical video structure, as more fully disclosed herein. The estimator component can integrate dissimilarity level information into decision-making to facilitate generating a high-precision prediction that can be based at least in part on an individual macroblock's motion estimation result and/or the overall motion of this individual macroblock's surrounding area in the image. Based at least in part on these comprehensive considerations, the estimator component can use (e.g., apply) one or more rules in the set of rules to facilitate reducing the complexity of and/or improve the efficiency (e.g., speed) of the motion estimation process, wherein the set of rules can efficiently improve encoding performance (e.g., increasing the speed of encoding) without sacrificing encoding quality. Moreover, certain rules (e.g., application-specific rules) of the set of rules can take advantage of distinctive features associated with, for example, a particular type of application (e.g., an application relating to video conferencing videos), to provide further performance boost (e.g., further increase of speed in encoding of the video frame) for the application.

Referring now to the drawings, FIG. 1 illustrates a block diagram of an example system 100 that can efficiently encode digital media data in accordance with various aspects and implementations described herein. The system 100 can include an encoder component 102 that encodes received digital media data (e.g., digital video content, audio content, still image, multimedia content, etc.) to produce encoded digital media data as an output. The encoder component 102 can encode or compress the digital media data in accordance with a defined encoding algorithm(s), which can include a fast motion estimation algorithm. The encoder component 102 can be associated with (e.g., part of, communicatively connected to) a communication device (not shown in FIG. 1). The communication device can be, for example, a computer (e.g., desktop computer, laptop computer), a mobile phone, an electronic tablet, a video player, a digital frame, etc.

The encoder component 102 can include an estimator component 104 that can perform motion estimation on video content using the fast motion estimation algorithm and/or another desired motion estimation algorithm(s), as more fully disclosed herein. The encoder component 102 also can include a coder component 106 that can perform (e.g., execute) one or more encoding-related functions (e.g., data compression) to encode video content (e.g., video frames of a video frame sequence), such as, for example, encoding-related functions other than the motion estimation functions performed by the estimator component 104. In some implementations, the estimator component 104 can be part of the coder component 106.

The estimator component 104 can use the fast motion estimation algorithm in relation to performing motion estimation on a hierarchical structure (e.g., multi-level hierarchical video structure). The estimator component 104 can down-sample the original video content by a defined or dynamically determined down-sampling factor (e.g., down-sampling factor >1.0) to generate a multiple-resolution pyramid structure of the video content (e.g., video frame of a sequence).

Figure 2:
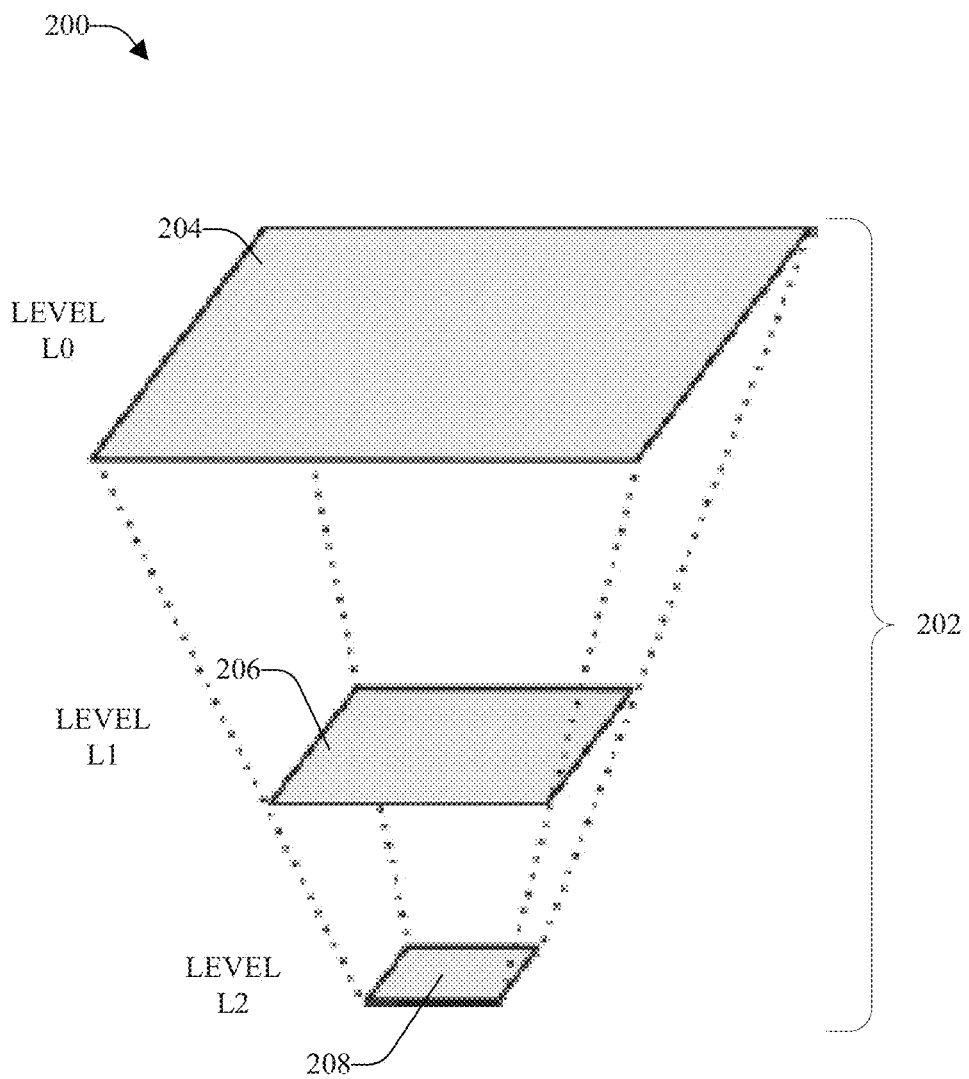
FIG. 2 depicts a diagram of an example hierarchical structure of video content in accordance with various aspects and implementations.

Referring briefly to FIG. 2 (along with FIG. 1), FIG. 2 depicts a diagram of an example hierarchical structure 200 of video content in accordance with various aspects and implementations. The estimator component 104 can down-sample the video content (e.g., video frame of a sequence of video frames) by a desired down-sampling factor to generate one or more down-sampled images that can be arranged in a multi-level pyramid structure 202 of the video content. In some implementations, the multi-level pyramid structure 202 can be a three-level pyramid structure, as depicted in FIG. 2, although, in other implementations, the multi-level pyramid structure 202 can contain less than three levels or more than three levels. The down-sampling factor can be a fraction that can be written as a/b where a>b, wherein a can be a number (e.g., real or integer number) associated with a higher-resolution level image in the hierarchy of the structure 202 and b can be a number associated with a lower-resolution level image in the hierarchy of the structure 202, where a>b (e.g., a=2, b=1). For example, in the example multi-level pyramid structure 202, the down-sampling factor can be 2. The estimator component 104 can generate the three-level pyramid structure (e.g., 202) to include an original visual image 204, a first down-sampled image 206, and a second down-sampled image 208 at respective levels in the hierarchy of the three-level pyramid structure (e.g., 202). For instance, the multi-level pyramid structure 202 can include a level L0 that can be associated with the original image 204 of the video content in original size. The structure 202 also can include level L1 that can be associated with the first down-sampled image 206, which can have a first smaller size that is smaller than the original size of the original image 204. The structure 202 further can include level L2 that can be associated with the second down-sampled image 208, which can have a second smaller size that is smaller than the original size and the first smaller size. If the down-sampling factor is 2, and the down-sampling occurs in both the x and y direction, the first down-sampled image 206 can be one-fourth the size of the original image 204, and the second down-sampled image 208 can be one-fourth the size of the first down-sampled image 206 and one-sixteenth the size of the original image 204.

Figure 3:
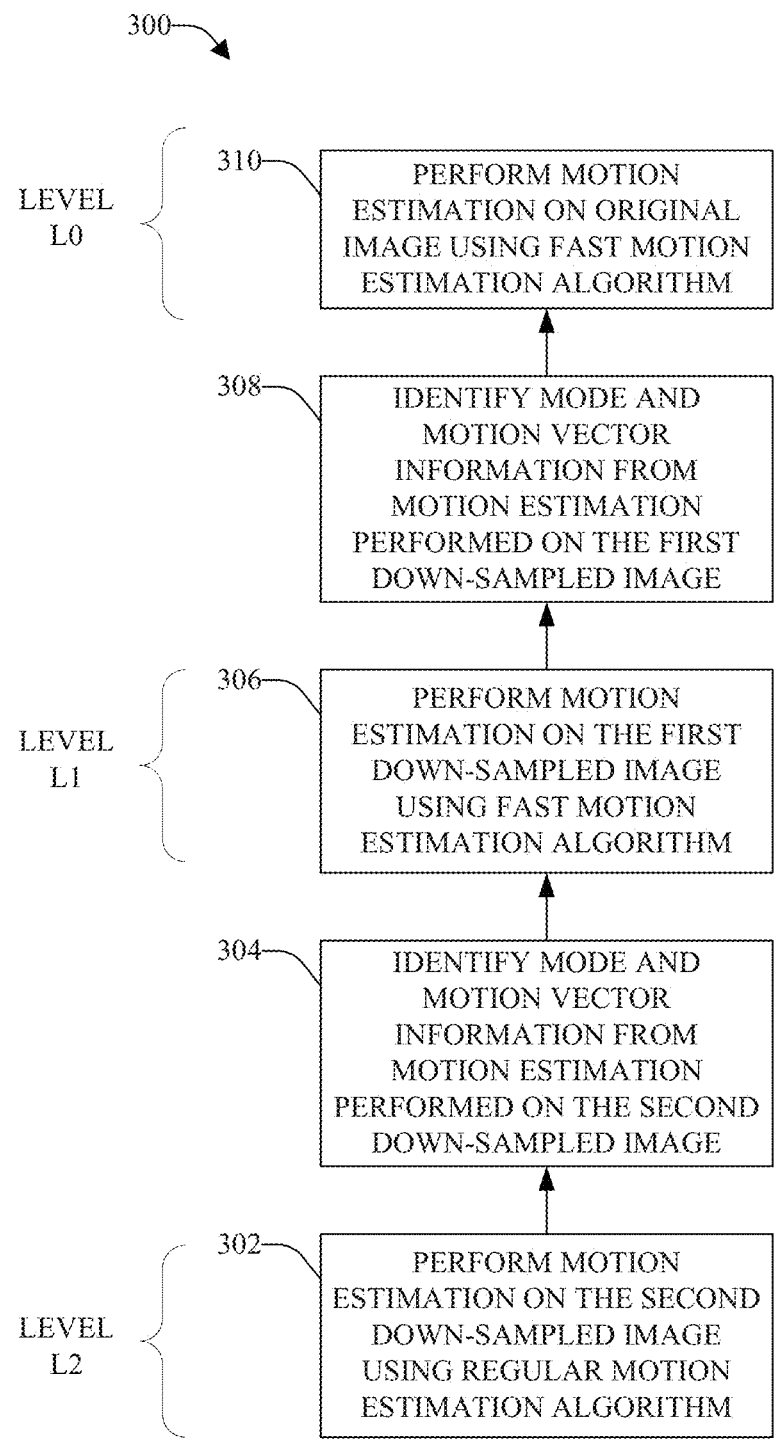
FIG. 3 illustrates a flow diagram of an example bottom-up encoding order, in accordance with various aspects and implementations of this disclosure.

Turning briefly to FIG. 3 (along with FIGS. 1 and 2), FIG. 3 illustrates a flow diagram of an example bottom-up encoding order 300, in accordance with various aspects and implementations of this disclosure. The estimator component 104 can use the bottom-up encoding order 300 in multi-resolution level encoding. The estimator component 104 can perform motion estimation on the second down-sampled image 208 at a lowest-resolution level first (e.g., L2) using a regular motion estimation (ME) algorithm, as shown at reference numeral 302. For instance, the estimator component 104 can perform motion estimation on the second down-sampled image 208 of the lowest-resolution level, L2, using a regular block-based method or technique. As part of generating the motion estimation for the image (e.g., 208) of a level of the hierarchy, the estimator component 104 can generate a subset of motion vectors as part of a motion vector result. The estimator component 104 can collect and/or identify mode (e.g., prediction mode) and motion vector (MV) information (e.g., motion vector results) relating to the motion estimation performed on the second down-sampled image 208 at the lowest-resolution level, L2, as shown at reference numeral 304.

The estimator component 104 can move up to the next higher resolution level, which can be L1, to perform motion estimation on the first down-sampled image 206 at that resolution level using a fast motion estimation algorithm, as depicted at reference numeral 306. As illustrated at reference numeral 308, the estimator component 104 can collect and/or identify mode and motion vector information (e.g., motion vector results) relating to the motion estimation just performed on the first down-sampled image 206 at the current-resolution level, L1. The estimator component 104 can proceed to perform motion estimation on next higher resolution level(s) of the video content using the bottom-up encoding order 300 to reach the highest-resolution level, which can be L0. The estimator component 104 can perform motion estimation on the original image 204 associated with the highest-resolution level using a fast motion estimation algorithm, as depicted at reference numeral 310.

As part of a fast motion estimation algorithm, the estimator component 104 can perform motion estimation on an image (e.g., image 206) associated with a next-higher resolution level (e.g., L1) based at least in part on the mode and motion vector information obtained from the motion estimation performed on the image (e.g., image 208) at the lower resolution level (e.g., L2). The estimator component 104 can use the lower-resolution level mode and associated motion vector results associated with the lower-level image (e.g., image 208) directly or as a predictor of motion estimation in relation to the image (e.g., image 206) associated with the next-higher resolution level (e.g., L1) to generate the motion estimation of the image (e.g., image 206) of the next-higher resolution level (e.g., L1). By doing this, the estimator component 104 can increase the rate (e.g., speed) of performing the motion estimation process on the image associated with the next-higher resolution level. Using the mode and motion vector results of low(er)-resolution level (e.g., L2) can reduce the complexity of performing the motion estimation on the image (e.g., image 206) of the next-higher resolution level (e.g., L1), while still maintaining the same, or at least substantially the same, encoding quality. For instance, since the second down-sampled image 208 of the lower resolution level, L2, is a down-sampled image of the first down-sampled image 206 of the resolution level (e.g., next higher resolution level), L1, there can be a certain degree of correlation between the image 208 associated with level L2 and the image 206 associated with level L1. The respective mode selections and motion vector results of the respective images, the image 206 associated with level L1 and the image 208 associated with level L2, can have a certain level of resemblance to each other. However, since the image 208 associated with L2 can contain less detail than the image 206 associated with L1, the mode and motion vector information for the image 208 of L2 may not always be reliable enough to be a good indicator for motion estimation on the image 206 of L1. If the information associated with the motion estimation on the image 208 of L2 is used without sufficient analysis, it can cause a motion estimation on the image 206 of L1 to have a lower and/or undesirable level of preciseness, which can result in poorer encoding quality.

To facilitate ensuring a desirable motion estimation and maintaining high encoding quality, during the multi-level encoding process, the estimator component 104 can collect encoding-related information relating to the encoding of video content, such as for example, motion estimation results from motion estimation performed on an image(s) of a certain level(s). The estimator component 104 can analyze the encoding-related information and apply defined coding criterion(s) and/or corresponding coding rules (e.g., as described herein) to such information to generate analysis results. As part of the analysis, the estimator component 104 can identify a desirable decision-making criterion(s) to determine what items of encoding-related information are valid and/or reliable for use in generating a motion estimation on an image (e.g., image 206) for a next level (e.g., next-higher resolution level), and identify and/or disregard items of information deemed unreliable by the estimator component 104. In addition to using motion estimation results from an image (e.g., image 208) associated with a lower-resolution level (e.g., L2) when performing motion estimation on an image (e.g., image 206) of a next-higher resolution level (e.g., L1), the estimator component 104 can use spatial information associated with the image (e.g., image 206) of the current higher-resolution level (e.g., L1) to facilitate performing motion estimation on the current image (e.g., image 206). The estimator component 104 can use the spatial information, for example, to facilitate prediction of motion vectors based at least in part on the previously encoded area in the current video frame (e.g., image 206), in accordance with the fast motion estimation algorithm.

Information relating to encoding of the video content can be stored in a data store 108. The estimator component 104, or other components (e.g., coder component 106, processor component (not shown in FIG. 1), etc.) of the encoder component 102 can retrieve information from the data store 108, as desired. For example, the estimator component 104 can retrieve mode and motion vector results associated with motion estimation performed on an image (e.g., 208) associated with a lower resolution level (e.g., L2) from the data store 108 for use in performing motion estimation on an image (e.g., 206) associated with a next-higher resolution level (e.g., L1), in accordance with the fast motion estimation algorithm.

When performing motion estimation on the image 208 of L2, the estimator component 104 can use a traditional motion estimation technique, such as a block-based motion estimation method, to generate the motion estimation for the image 208 of L2. The estimator component 104 can divide the image 208 (e.g., video frame) of L2 into a number of macroblocks with specified size. For example, the estimator component 104 can divide the image 208 so that it contains macroblocks with size of M×M pixels (e.g., 16×16 pixels), wherein M can be a desired integer number.

The estimator component 104 can use, for example, a set of different macroblock prediction modes, which can belong to 2 categories: intra modes and inter modes. Intra modes can include, for example, average of above and left pixels (DC_PRED), vertical prediction (V_PRED), horizontal prediction (H_PRED), true motion prediction (TM_PRED), and block based prediction (B_PRED). For block based prediction, each block can have a size of N×N pixels (e.g., 4×4 pixels) and can have its own block-level prediction mode. N can be a desired integer number that can be different from or the same as M. The inter modes can include, for example, nearest motion vector (NEARESTMV), near motion vector (NEARMV), zero motion vector (ZEROMV), new motion vector (NEWMV), and split motion vector (SPLITMV). The estimator component 104 also can use a set of block-level prediction modes when the macroblock prediction modes are not able to provide a satisfactory prediction. In some implementations, the set of block-level prediction modes can include, for example, 14 block-level prediction modes.

The estimator component 104 can use multiple reference video frames, for example, intra-frame, last frame, golden frame, and alternate reference frame. The estimator component 104 can search for and identify the best matched macroblock from those reference frames, in accordance with one or more defined coding criterion.

For each macroblock, the estimator component 104, using a regular motion estimation algorithm (e.g., in relation to the lowest resolution level L2), can evaluate all modes, including intra and inter modes, on all possible reference frames. In this example, given the number of modes and number of possible reference frames, the estimator component 104 can thereby end up evaluating (e.g., checking) up to 20 combinations of mode and reference frame. The estimator component 104 can identify and select the combination of mode and reference frame that has the best rate-distortion (RD) score (e.g., least RD error level) as the final selection for the motion estimation result for the image 208 of the L2 level. A regular motion estimation algorithm can include, for example, a block-based or block-matching motion estimation algorithm, a pixel recursive algorithm, a motion estimation algorithm that incorporates phase correlation and frequency domain methods, or a motion estimation algorithm that uses Bayesian-type estimation.

The estimator component 104 can save the motion estimation results associated with the second down-sampled image 208 of the L2 level, for example, in a data store 108. The estimator component 104 can use information relating to the motion estimation results of the image 208 to generate a prediction for the motion estimation on the image 206 for the next-higher resolution level, L1. In some implementations, in order to provide an improved motion estimation prediction, the estimator component 104 also can obtain information relating to the surrounding area motion information (e.g., associated with macroblocks that surround the current macroblock), in addition to the individual macroblock motion information, for an image (e.g., image 208). A video image often can include different objects. Each object can have its own movement, and typically for an object there may not be significant relative movement inside the object. If a current macroblock and its nearby macroblocks belong to the same object, the estimator component 104 can expect or assume that these macroblocks will have similar motion. Otherwise, the current macroblock can have motion that can be substantially different from its nearby (e.g., surrounding) macroblocks.

The estimator component 104 can collect information relating to the surrounding area motion information of the nearby macroblocks in addition to the individual macroblock motion information for a given video frame image (e.g., image 208), and such information can be stored in the data store 108 for use by the estimator component 104 or other components (e.g., of the encoder component 102). The estimator component 104 can calculate a dissimilarity level of the current macroblock of the image 208 of L2, based at least in part on the respective motion results on the neighbor macroblocks that surround the current macroblock of the image 208 on L2. The estimator component 104 can calculate the dissimilarity level for an inter-mode macroblock, and use the surrounding neighbor macroblocks (e.g., 8 neighbor macroblocks) to calculate the dissimilarity level of the current macroblock of the current image (e.g., image 208 of L2). If a neighbor macroblock of the current image (e.g., image 208) is intra-mode, the estimator component 104 can exclude that neighbor macroblock from the calculation of the dissimilarity level of the current macroblock of the current image (e.g., image 208 of L2).

Figure 4:
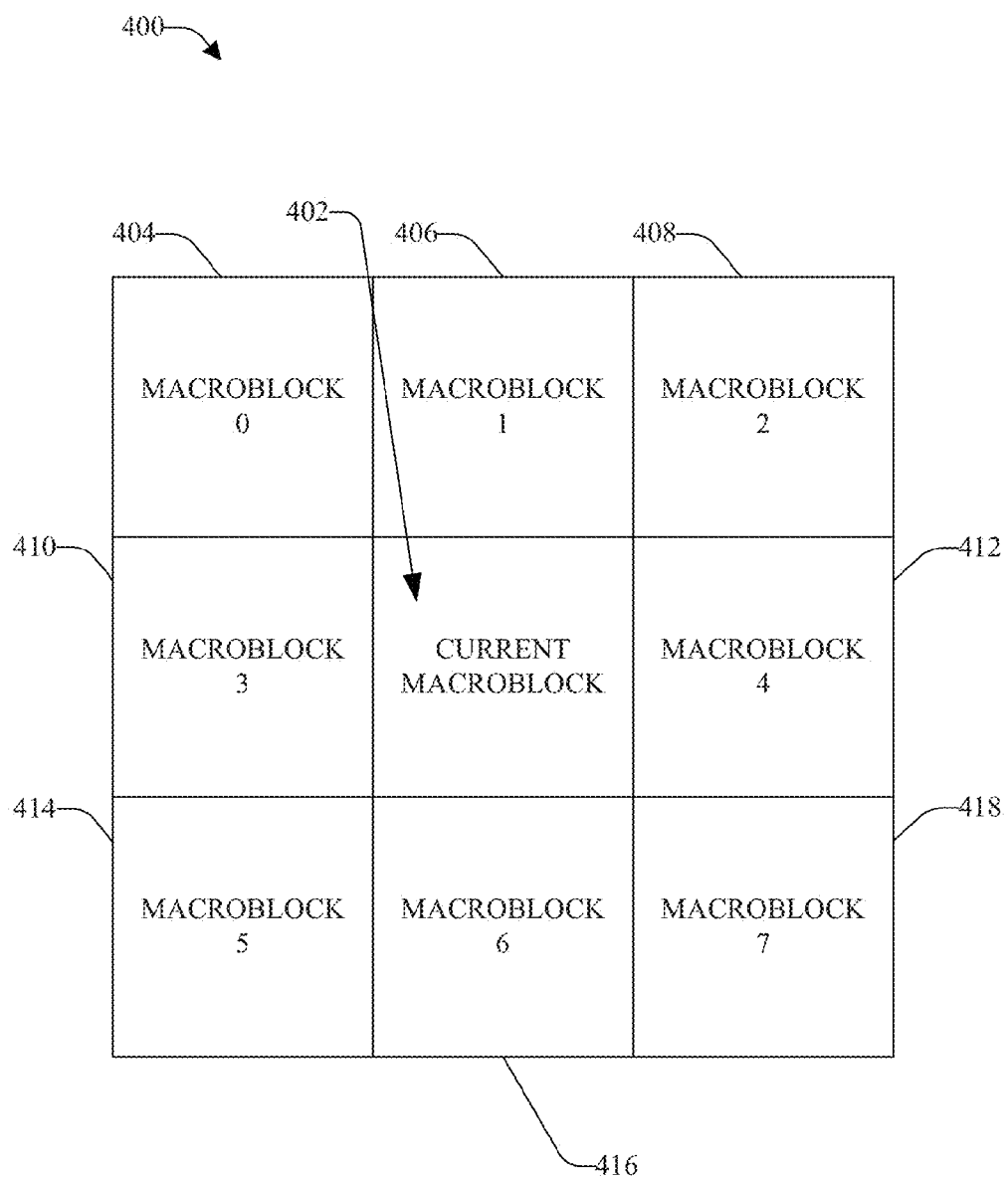
FIG. 4 illustrates a diagram of an example video frame divided into a plurality of macroblocks, in accordance with various aspects and implementations.

Referring briefly to FIG. 4 (along with FIGS. 1 and 2), FIG. 4 illustrates a diagram of an example video frame 400 divided into a plurality of macroblocks, in accordance with various aspects and implementations. The video frame 400 can be, for example, the second down-sampled image 208 of level L2, the first down-sampled image 206 of level L1, or the original image 204 of level L0, depending on which image is being evaluated by the estimator component 104. The video frame 400 can include a current macroblock (MB) 402, and 8 neighbor macroblocks, including macroblock$_0$ (404), macroblock$_1$ (406), macroblock$_2$ (408), macroblock$_3$ (410), macroblock$_4$ (412), macroblock$_5$ (414), macroblock$_6$ (416), and macroblock$_7$ (418). The estimator component 104 can calculate the dissimilarity level for the current macroblock 402 using motion information relating to the surrounding neighbor macroblocks 404 through 418.

The estimator component 104 can calculate the dissimilarity level for a current macroblock (e.g., 402) as follows. Once estimator component 104 finishes performing the motion estimation for the image 208 of the lowest resolution level, L2, for the image 208, the estimator component 104 can calculate each macroblock's dissimilarity level d using its n neighboring macroblocks. The motion vector of the current macroblock (e.g., 402) can be (xc, yc), and the motion vector of i-th neighbor (e.g., neighbor macroblock of the current macroblock) can be (xi, yi). The estimator component 104 can calculate d in accordance with the following equation:

$$d=\max(\max(|\min\{xi\}-xc|,|\max\{xi\}-xc|),\max(|\min\{yi\}-yc|,|\max\{yi\}-yc|)),$$

where i is an integer number, i=0, 1, . . . , n−1, where d can represent the surrounding area's motion variation in relation to the current macroblock (e.g., current macroblock 402 when that is the macroblock currently under evaluation for determining the dissimilarity level d).

As a more detailed example, in some implementations, the estimator component 104 can use insertion sort to identify or locate (e.g., find) the maximum and minimum of the neighbor macroblocks' motion vectors, and can calculate the dissimilarity level of the current macroblock (e.g., 402). For example, there can be up to n+1 (e.g., n=7, as shown in FIG. 4) neighbor macroblocks (e.g., macroblocks 404 through 418) associated with (e.g., surrounding) a current macroblock (e.g., 402, as shown in FIG. 4), wherein n can be an integer number. The estimator component 104 can use insertion sort to facilitate identifying or locating the maximum and minimum of the neighbor macroblocks' motion vectors in accordance with the following insertion sort process:

insertion_sort(x[0], . . . , x[i], . . . , x[n]);
insertion_sort(y[0], . . . , y[i], . . . , y[n]);
where (x[i], y[i]) is i-th neighbor macroblock's motion vector, and i=0, 1, . . . , n.

The estimator component 104 can save (e.g., store) the sorted motion vectors in 2 arrays, x_sorted and y_sorted, in ascending order in the data store 108. The estimator component 104 can calculate the dissimilarity level d for the current macroblock (e.g., 402) as a function of the x-direction dissimilarity level and the y-direction dissimilarity level. In some implementations, the estimator component 104 can calculate the dissimilarity level d for the current macroblock (e.g., 402) using the following example equations:

$$x\_\max=\max(\text{abs}(x\_\text{sorted}[0]-xc),\text{abs}(x\_\text{sorted}[n]-xc));$$

$$y\_\max=\max(\text{abs}(y\_\text{sorted}[0]-yc),\text{abs}(y\_\text{sorted}[n]-yc));$$

$$d=\max(x\_\max,y\_\max).$$

In these example equations, (xc, yc) is the motion vector of the current macroblock (e.g., 402); x_max is the x-direction dissimilarity level calculated (e.g., by the estimator component 104) as the maximum of the absolute value of x_sorted[0]−xc and the absolute value of x_sorted[n]−xc; and y_max is the y-direction dissimilarity level calculated (e.g., by the estimator component 104) as the maximum of the absolute value of y_sorted[0]−yc and the absolute value of y_sorted[n]−yc. The estimator component 104 can calculate the dissimilarity level d for the current macroblock (e.g., 402) as the maximum of the x-direction dissimilarity level and the y-direction dissimilarity level. It shall be appreciated that other methods or equations may be used to calculate the dissimilarity level d for a current macroblock (e.g., 402) and such other methods and/or equations remain within the scope of embodiments of this disclosure.

If the estimator component 104 determines the dissimilarity level d for the current macroblock (e.g., 402) is a relatively small level (e.g., below a defined threshold dissimilarity level), the estimator component 104 can determine there is not significant relative movement around this area. This can indicate to the estimator component 104 that the current macroblock (e.g., 402) and its nearby macroblocks (e.g., 404 through 418) are located in one object, and they have uniform motion, or at least substantially uniform motion. Otherwise, if the estimator component 104 determines the dissimilarity level d of the current macroblock (e.g., 402) is a relatively larger level (e.g., at or above the defined threshold dissimilarity level), the estimator component 104 can determine that it is likely there are multiple relatively-moving objects existing in this local area of the image (e.g., whichever of the image 208, image 206, or image 204 currently under evaluation).

The estimator component 104 can store the motion information associated with the image 208 along with the dissimilarity level d calculated for the image 208 of L2 in the data store 108. The estimator component 104 can use the motion information along with the dissimilarity level d calculated for the image 208 of L2 when performing motion estimation on a corresponding image 206 in the next-higher resolution level, L1.

The estimator component 104 can perform the motion estimation on the first down-sampled image 206 associated with level L1, based at least in part on the motion information associated with the image 208 and the dissimilarity level d calculated for the image 208 of L2. For instance, the estimator component 104 can propagate information relating to the mode and motion vector results for the image 208 of level L2 to the next-higher resolution level L1 associated with the first down-sampled image 206. The estimator component 104 can generate a macroblock mapping between the image 208 associated with L2 and the image 206 associated with L1, based at least in part on (e.g., as a function of) the down-sampling factor between the image 208 associated with L2 and the image 206 associated with L1. For example, if the down-sampling factor between the image 208 associated with L2 and the image 206 associated with L1 is 2, each parent macroblock on the image 208 associated with L2 can correspond to 4 child macroblocks on the image 206 associated with L1. All child macroblocks of the image 206 can share the motion information associated with their same parent macroblock of the image 208.

Figure 5:
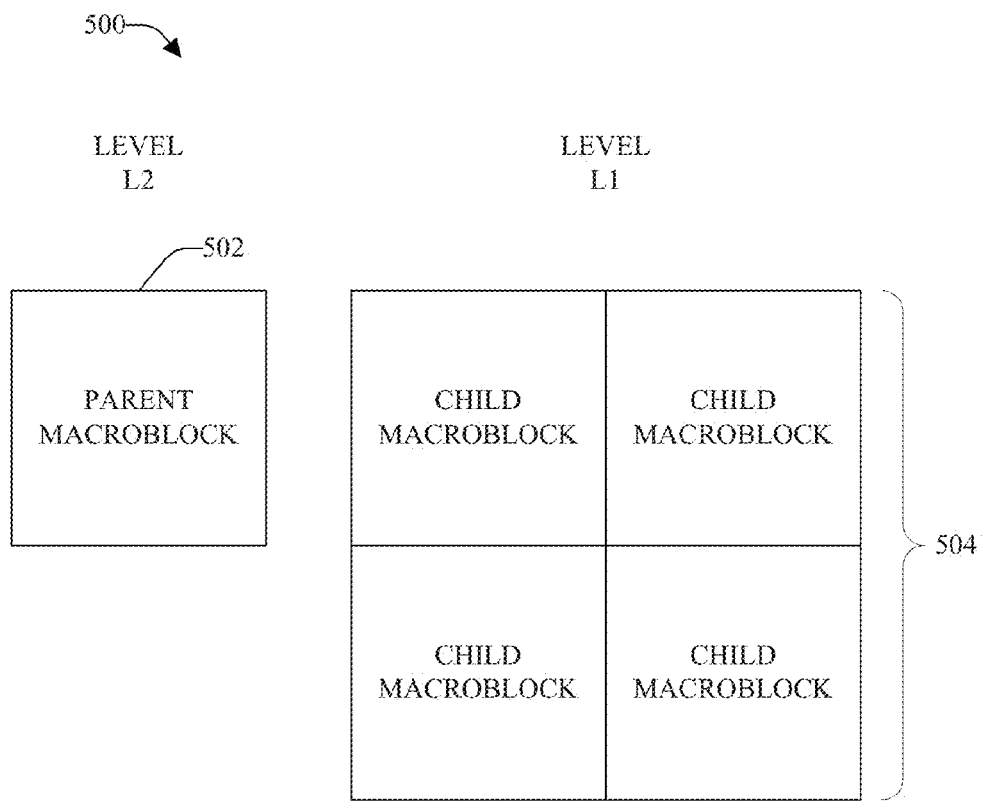
FIG. 5 depicts a diagram of an example macroblock mapping from one parent macroblock of an image on a lower-resolution to its child macroblocks in an image of a higher-resolution level, in accordance with various aspects and implementations.

Turning briefly to FIG. 5 (along with FIGS. 1 and 2), FIG. 5 depicts a diagram of an example macroblock mapping 500 from one parent macroblock of an image (e.g., 208) on a lower-resolution level (e.g., lowest resolution level L2) to its child macroblocks in an image (e.g., 206) of a higher-resolution level (e.g., next-higher resolution level L1), in accordance with various aspects and implementations. The macroblock mapping 500 can be between a parent macroblock 502 associated with the image (e.g., 208) for a lower resolution level (e.g., L2) and a set of child macroblocks 504 (e.g., 4 child macroblocks) associated with the image (e.g., 206) for a higher resolution level (e.g., next-higher resolution level, L1). The location of the set of child macroblocks 504 in the image (e.g., 206) for the higher resolution level (e.g., L1) can correspond or be mapped to the location of the parent macroblock 502 in the image (e.g., 208) for the lower resolution level (e.g., L2). The number of child macroblocks in the set of child macroblocks 504 can be based at least in part on the down-sampling factor between the image (e.g., 208) of the lower resolution level (e.g., L2) and the image (e.g., 206) of the higher resolution level (e.g., L1).

For a parent macroblock (e.g., 502) of the image (e.g., 208) of a lower-resolution level (e.g., L2), the estimator component 104 can assign the motion information for that parent macroblock to its child macroblocks (e.g., set of child macroblocks 504) associated with the image (e.g., 206) of the next-higher resolution level (e.g., L1). The motion information can include information relating to, for example, the mode of the parent macroblock (parent_mode), the reference frame of the parent macroblock (parent_ref_frame), the parent motion vector (parent_mv) if the parent macroblock mode is inter mode, the dissimilarity level d of the current macroblock, and/or other information. The estimator component 104 can upscale the parent macroblock's actual motion vector for the image (e.g., 208) of the lower-resolution level (e.g., L2) by multiplying it by the down-sampling factor in order to obtain the parent motion vector for use with the corresponding current macroblock as a result, and the parent motion vector (e.g., as upscaled) can be clamped to the valid motion vector range associated with the image (e.g., 206) of the next-higher resolution level (e.g., L1).

Figure 6:
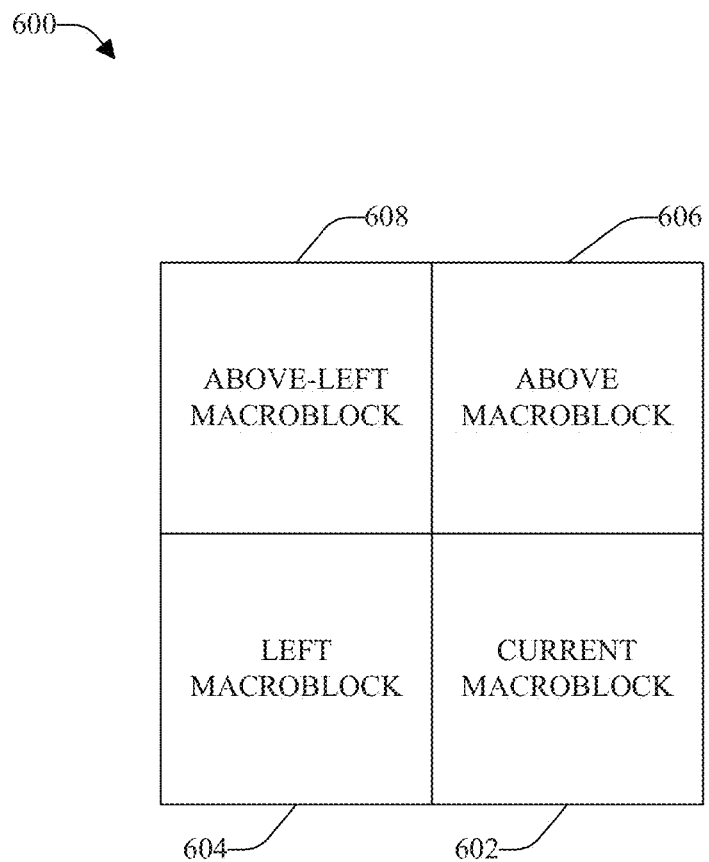
FIG. 6 presents a diagram of a subset of macroblocks associated with a current video frame for a level of a multi-level structure, in accordance with various aspects and implementations.

The estimator component 104 also can generate a spatial prediction for the current video frame (e.g., image 206 for L1). Referring briefly to FIG. 6 (along with FIGS. 1 and 2), FIG. 6 depicts a subset of macroblocks 600 associated with a current video frame (e.g., image 206) for a level (e.g., L1) of a multi-level structure (e.g., 202), in accordance with various aspects and implementations. The subset of macroblocks 600 can include a current macroblock 602 being processed as part of the motion estimation process described herein. The subset of macroblocks 600 also can include a left macroblock 604 that can be located to the left of (and/or can be contiguous to) the current macroblock 602, an above macroblock 606 that can be located directly above (and/or can be contiguous to) the current macroblock 602, and an above-left macroblock 608 that can be located above and to the left of, and can neighbor, the current macroblock 602. In some implementations, the left macroblock 604, above macroblock 606 and/or above-left macroblock 608 can be portions of the video frame that have previously been encoded by the encoder component 102.

For a current macroblock (e.g., 602), the estimator component 104 can analyze the previously encoded nearby macroblocks (e.g., surrounding macroblocks, such as the left macroblock 604, above macroblock 606 and/or above-left macroblock 608) on the current video frame (e.g., image 206). Based at least in part on the results of the analysis, the estimator component 104 can calculate a motion vector predictor for the current macroblock (e.g., 602), which can be referred to as a child motion vector predictor (child_mvp).

Figure 7:
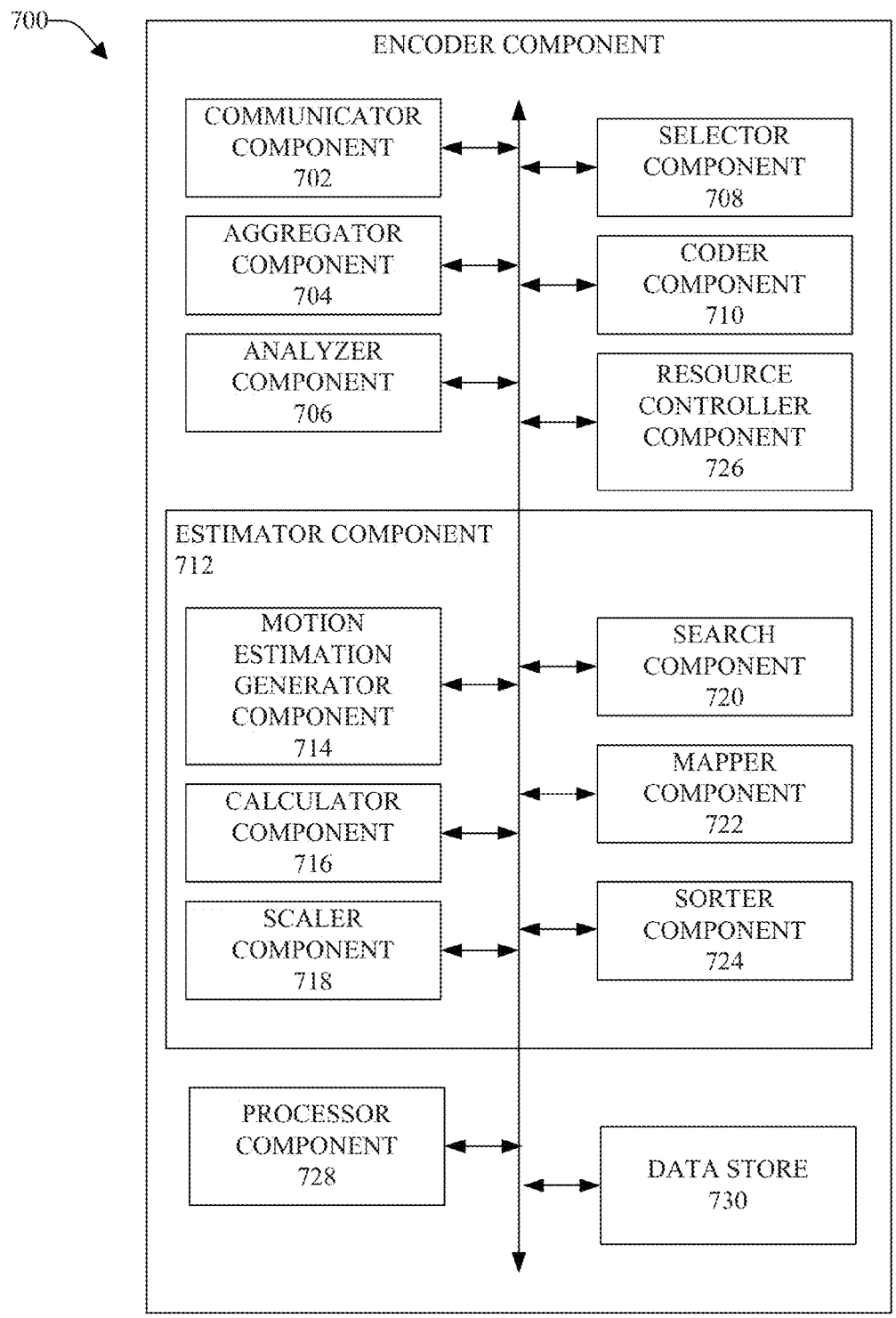
FIG. 7 illustrates a block diagram of an example encoder component that can efficiently coding digital media data in accordance with various aspects and implementations described herein.

In accordance with the fast motion estimation algorithm implemented in embodiments of this disclosure (e.g., referenced in FIG. 3 at 306), the estimator component 104 can apply one or more rules (e.g., defined coding rules) relating to mode selection and motion search to facilitate performing motion estimation on this hierarchy level (e.g., L1). The one or more rules relating to mode selection and motion search can be based at least in part on certain assumptions that can be used to make the processing of the current macroblock (e.g., performing motion estimation on the current macroblock (e.g., 602)) more efficient (e.g., less complex). The one or more rules relating to mode selection and motion search can be implemented as part of the fast motion estimation algorithm. In some implementations, a resource controller component of the encoder component (e.g., not shown in FIG. 1; as depicted in FIG. 7) can dynamically identify an amount of processing resources to allocate to the estimator component 104 as a function of the one or more rules (e.g., as a function of whether the estimator component 104 identifies a parent macroblock as intra mode or inter mode).

One rule can be an intra mode rule. Under this rule, if the estimator component 104 identifies a parent macroblock (e.g., 502) as being intra mode, the estimator component 104 can identify (e.g., based on an assumption) the child macroblock (e.g., in the set 504) to be intra mode. Based at least in part on identifying the child macroblock as intra mode, the estimator component 104 can examine (e.g., check, inspect) and/or evaluate the intra modes and can select the intra mode that has the best RD score (e.g., the intra mode with the least RD error) relative to the other intra modes.

Another rule can be an inter mode rule. Under the second rule, if the estimator component 104 identifies the parent macroblock (e.g., 502) as inter mode, the estimator component 104 can examine and/or evaluate both the intra and inter modes for the child macroblock (e.g., child macroblock of the set 504). When the parent macroblock is inter mode, a best matching mode can be one that is either an intra mode or an inter mode associated with the child macroblock. The estimator component 104 can examine (e.g., check, inspect) and/or evaluate the intra modes and inter modes for the child macroblock, and can select the intra mode or inter mode that has the best RD score (e.g., the intra mode or inter mode with the least RD error) relative to the other intra modes or inter modes associated with the child macroblock.

Still another rule(s) can relate to motion searches. For example, if the estimator component 104 determines that a motion search has to be performed for the child macroblock (e.g., child macroblock of the set 504), the estimator component 104 can use the parent motion vector (parent_mv) associated with the child macroblock as the starting motion vector for the motion search.

Yet another rule(s) can relate to the dissimilarity level d. The estimator component 104 can determine whether the dissimilarity level d is less than a first defined threshold level (threshold$_1$) (e.g., in some implementations, 8 can be used as the threshold$_1$, and in other implementations, another desired integer value higher or lower than 8 can be used). In response to determining the dissimilarity level d is less than the first defined threshold level, the estimator component 104 can perform a motion search on the parent reference frame (parent_ref_frame), and can bypass a motion search on all other reference frames.

In accordance with still another rule, the estimator component 104 can determine whether the dissimilarity level d is less than a second defined threshold (threshold$_2$) (e.g., in some implementations, 256 can be used as threshold$_2$, in other implementations, another desired integer value higher or lower than 256 can be used). In response to determining the dissimilarity level d is less than the second defined threshold level, the estimator component 104 can use a center-biased motion search method (e.g., hex search), and can adjust (e.g., reduce) the search range according to (e.g., as a function of) the dissimilarity level d.

For example, if the estimator component 104 determines that the search range is to be adjusted, the estimator component 104 can adjust the search range in accordance with the following example algorithm, which can be represented in pseudocode as follows:

```
if (d <= j), search_range = +/-k        /* small dissimilarity */
else if (d <= p), search_range = +/-q   /* moderate dissimilarity */
else search_range = +/-r;               /* large dissimilarity */
``` where d is the dissimilarity level, and search_range is the motion search range. In the example pseudocode, j, k, p, q, and r can each be respective integer values. In accordance with various implementations, the estimator component 104 can set j to be 32 (or more or less than 32), k to be 8 (or more or less than 8), p to be 128 (or more or less than 128), q to be 16 (or more or less than 16), and r to be 24 (or more or less than 24), in accordance with defined coding criterion(s). The value of j typically can be less than p, the value of k typically can be less than the value of q, and the value of q typically can be less than the value of r.

If the estimator component 104 determines the dissimilarity level is not less than the second defined threshold, the estimator component 104 can use the parent motion vector (parent_mv) associated with the child macroblock as the starting motion vector, select a larger search range (e.g., +/−24 through +/−128), and/or perform a comprehensive motion search (e.g., n-step search).

For video images in video conferencing, especially talking-head video (e.g., where a person's head takes up a significant portion of the video frame), there often can be a still or slow-moving background surrounding the person's head, wherein the still or slow-moving background can have a consistent or substantially consistent motion (or lack of motion). In such a situation, the following motion estimation rules, which also can be part of the fast motion estimation algorithm, can be used by the estimator component 104 and can facilitate efficient generation of the motion estimation for the video images of the video frame sequence.

One rule can relate to instances where the dissimilarity level d associated with a current macroblock is zero. The current macroblock can be in the current image (e.g., image 206) associated with a current resolution level, and the current macroblock can be a child macroblock of a parent macroblock in an image (e.g., image 208) associated with a lower resolution level. If the estimator component 104 determines that the dissimilarity level is zero in relation to the current macroblock, and determines the parent motion vector (parent_mv) associated with the current macroblock equals the child motion vector predictor (child_mvp), the estimator component 104 can assign the parent motion vector (parent_mv) to the current macroblock, and terminate the motion estimation process.

Another rule can relate to instances where the parent macroblock (e.g., of image 208) associated with the child macroblock (e.g., in this instance, the current macroblock of image 206) has a zero motion vector and the child motion vector predictor associated with the child macroblock also is zero. If the estimator component 104 determines the parent macroblock associated with the child macroblock has a zero motion vector, and determines the child motion vector predictor (child_mvp) associated with the child macroblock also is zero, the estimator component 104 can assign a zero motion vector to the current macroblock (e.g., child macroblock of the parent macroblock), and terminate the motion estimation process.

Still another rule can relate to instances where the parent macroblock has a zero motion vector (e.g., but the child motion vector predictor associated with the child macroblock is not zero). If the estimator component 104 determines the parent macroblock has a zero motion vector (and child_mvp≠0), and determines the dissimilarity level is less than a third defined threshold (threshold$_3$), the estimator component 104 can bypass a full-pixel search and can perform a sub-pixel search as part of the motion estimation process for the current video frame (e.g., image 206 of L1). In certain implementations, in response to the estimator component 104 determining the parent macroblock has a zero motion vector (and child_mvp≠0) and determining the dissimilarity level is less than a third defined threshold (threshold$_3$), the estimator component 104 can bypass a full-pixel search and only performs a sub-pixel search as the motion estimation process of the current macroblock in the current video frame (e.g., image 206 of L1). In such implementations, other types of searches as part of the motion estimation process of the current macroblock can be omitted as well, and the estimator component 104 can set the third defined threshold (threshold$_3$) to a desired defined value. In some implementations, the estimator component 104 can set the third defined threshold (threshold$_3$) to be 4, and in other implementations, the estimator component 104 can set the third defined threshold (threshold$_3$) to be more or less than 4, in accordance with defined coding criterion(s).

When the estimator component 104 completes the motion estimation on the image 206 of L1, the estimator component 104 can calculate the dissimilarity level d for the current macroblock of the current image (e.g., 206), and store the mode and motion information for the motion estimation associated with the image 206, e.g., in the data store 108. The estimator component 104 can retrieve the mode and motion information for the motion estimation associated with the image 206 from the data store 108, and can use such motion information in performing motion estimation on the original image 204 associated with the next-higher resolution level (e.g., the high-resolution level L0).

The estimator component 104 can perform motion estimation on the original image 204 of the high resolution level, L0, using the fast motion estimation algorithm, based at least in part on the mode and motion information associated with the image 206 of the next lower resolution level, L1. The estimator component 104 can perform motion estimation on the original image 204 of L0 in a same or similar way the estimator component 104 performed motion estimation on the image 206 associated with L1 based at least in part on the mode and motion information associated with the image 208 of the lower resolution level, L2. The estimator component 104 can propagate the mode and motion information associated with the image 206 of L1 to the high resolution level, L0. The estimator component 104 can perform motion estimation on the original image 204 of L0 using the fast motion estimation algorithm, including all or a portion of the rules disclosed herein in relation to the performing of the motion estimation on the first down-sampled image 206 associated with L1.

Generally, since the image 206 of L1 can contain significantly more detail than the image 208 of L2, the prediction from the mid-level resolution level, L1, to the high resolution level, L0, can be more precise than the prediction from the low resolution level, L2, to the mid-level resolution level, L1. As a result, in some implementations, the estimator component 104 can adjust (e.g., lower) the dissimilarity level d when making decisions relating to motion estimation of the image on L0 (204), which can decrease the amount of time to perform the motion estimation (e.g., increase rate of performing motion estimation), with the cost being minor quality loss in the encoding, when this is in accordance with the defined coding criterion(s). For example, when the estimator component 104 is performing motion estimation on the image 204 of L0 using the fast motion estimation algorithm, the estimator component 104 can adjust (e.g., lower) the dissimilarity level d so that the dissimilarity level d>>=1.

In hierarchical motion estimation, the fast motion estimation algorithm can desirably leverage the motion result of a lower resolution level when performing motion estimation on a next-higher resolution level, reduce the complexity of the motion estimation for the high(er)-resolution level, and reduce the amount of time to perform motion estimation on visual images. This fast motion estimation algorithm described herein can include various motion estimation rules, which have been created based on investigation and these rules are not biased towards any one piece of information, which can enable desirable (e.g., desirably good) encoding quality (e.g., maintaining encoding quality while encoding digital media data at a faster rate, as compared to conventional encoding techniques).

In a simulcast or spatial scalable video coding application, the encoder component 102 can use multiple resolution encoding, which can benefit from systems and methods described herein, including those involving the fast motion estimation algorithm. The fast motion estimation algorithm can be effective in improving the speed in generating a motion estimation of video content without having a negative effect, or at least without having a substantial negative effect, on video quality, and can work well in video conferencing applications, especially with regard to a "talking-head" type of video, where a person's head is in video against, for example, a relatively still or slow-moving background.

FIG. 7 illustrates a block diagram of an example encoder component 700 that can efficiently coding digital media data in accordance with various aspects and implementations described herein. The encoder component 700 can include a communicator component 702, an aggregator component 704, an analyzer component 706, a selector component 708, and a coder component 710.

The communicator component 702 can be used to communicate (e.g., transmit, receive) information between the encoder component 700 and other components (e.g., decoder component, user interface, media source, media capture device, data store, computer-readable storage media, etc.). The information can include, for example, video frames (e.g., visual images) of a video frame sequence, information that can facilitate encoding data associated with video frames, information relating to defined coding criterion or corresponding rules, information relating to coding parameters, coding-related algorithms (e.g., fast motion estimation algorithm), etc., that can be used by the encoder component 700 to facilitate enabling the encoder component 700 to encode data. The communicator component 702 also can transmit encoded video frames (e.g., encoded video bitstream) to, for example, a decoder component, data store, or computer-readable storage media. A decoder component (not shown) can receive the encoded video frames (e.g., encoded video bitstream), decode the encoded video frames and reconstruct the video frames, and can provide the reconstructed video content for presentation (e.g., display) on a display component (not shown) of a communication device. The communication device can be, for example, a computer (e.g., desktop computer, laptop computer), a mobile phone, an electronic tablet, a video player, a digital frame, etc.

The aggregator component 704 can aggregate data received (e.g., obtained) from various entities (e.g., media source, media capture device, processor, data store, coder component, coder management component, user interface, etc.). The aggregator component 704 can correlate respective items of data based at least in part on type of data, source of the data, time or date the data was generated or received, encoding state of the data, a video frame or coding unit to which the data relates, etc., to facilitate analyzing of the data by the analyzer component 706.

The analyzer component 706 can analyze data to facilitate encoding data, performing motion estimation, and/or propagating mode and motion vector information associated with an image of a lower resolution to be used to facilitate performing motion estimation on an image associated with a next higher resolution level. The analyzer component 706 also can analyze data to facilitate determining (e.g., calculating) a dissimilarity level for a macroblock, determining whether a dissimilarity level of a macroblock is within a threshold range, and/or perform other analysis of data. The analyzer component 706 can generate analysis results, based at least in part on the data analysis. The analyzer component 706 can provide the analysis results to another component (e.g., coder component 710, estimator component 712, resource controller component 726, processor component 728, data store 730, etc.) and the analysis results can be available for further processing or for use by the encoder component 700 in making determinations relating encoding visual images (e.g., video frames).

The selector component 708 can select items of data, an applicable encoding-related algorithm (e.g., compression algorithm, fast motion estimation algorithm, etc.), a macroblock, a motion vector, encoding-related parameter values, or other information, to facilitate encoding data, etc. For example, the selector component 708 can select one or more parameters, one or more items of data, etc., relevant to an encoding task (e.g., etc.) being performed by the encoder component 700.

The encoder component 700 also can include a coder component 710 that can encode or compress data associated with a video frame in accordance with a defined encoding compression algorithm and the fast motion estimation algorithm. In some implementations, the coder component 710 can use a specified quantization value that can correspond to the compression level to be used during the encoding of a macroblock of a video frame.

The encoder component 700 can include an estimator component 712 that can perform motion estimation of macroblocks of video frames to facilitate efficiently encoding the video frames, in accordance with encoding-related algorithms, including a fast motion estimation algorithm. The estimator component 712 can include a motion estimation generator component 714, a calculator component 716, a scaler component 718, a search component 720, a mapper component 722, and a sorter component 724.

The motion estimation generator component 714 can generate respective motion estimations for an original image and one or more corresponding down-sampled images, in accordance with the fast motion estimation algorithm. For a multi-level hierarchical image structure, the motion estimation generator component 714 can perform motion estimation on an image associated with a lowest resolution level of the image structure using a regular block-based technique for performing motion estimation. Using the fast motion estimation algorithm, the motion estimation generator component 714 can perform motion estimation on an image of a next higher resolution level of the multi-level image structure using information relating to the motion estimation performed on the image associated with the lowest (or lower) resolution level and/or spatial information associated with the image of the next higher resolution level. The information relating to the motion estimation performed on the image associated with the lowest (or lower) resolution level can include, for example, mode selection and motion vector information associated with such motion estimation. The spatial information can include, for example, information relating to previously encoded macroblocks of the image of the next higher resolution level.

The calculator component 716 can perform calculations on data values associated with encoding visual images to facilitate encoding the visual images. The calculator component 716 can identify or calculate a dissimilarity level d associated with a current macroblock (e.g., inter-mode macroblock) of a visual image during performing motion estimation on the visual image. The calculator component 716 can calculate the dissimilarity level d of the current macroblock as a function of the motion vector values associated with macroblocks neighboring the current macroblock and the motion vector of the current macroblock, as more fully described herein. The calculator component 716 also can calculate a motion vector predictor for a current macroblock of a current visual image on which motion estimation is being performed, wherein the motion vector predictor can be referred to as the child motion vector predictor (child_mvp).

The scaler component 718 can down-sample an image (e.g., original image) by a defined factor(s) to create one or more down-sampled images that can correspond to the image but be a smaller-scaled version of the image. In some implementations, the scaler component 718 can adjust (e.g., upscale) the actual parent motion vector of a parent macroblock of a lower resolution image to obtain a parent motion vector (e.g., upscaled parent motion vector) for use with a current macroblock (e.g., child macroblock of the parent macroblock) of a next higher resolution image. The scaler component 718 can clamp the parent motion vector (e.g., as upscaled) to the valid motion vector range associated with the image of the next-higher resolution level The search component 720 can perform a motion search on a visual image using one or more motion search techniques, in accordance with the fast motion estimation algorithm and associated rules, as more fully described herein. In some implementations, the one or more motion search techniques can include, for example, a motion search on a parent reference frame, a center-biased search technique or method, or an n-step motion search, in accordance with the fast motion estimation algorithm and associated rules. The search component 720 also can adjust a search range for the motion search, as desired (e.g., necessary), in accordance with the fast motion estimation algorithm and associated rules.

The mapper component 722 can generate a mapping of a parent macroblock of an image of a lower resolution level to a set of child macroblocks (of the parent macroblock) in an image of a next higher resolution level. The mapper component 722 also can map information associated with the parent macroblock to the corresponding set of child macroblocks. The mapper component 722 can store the generated mapping information in a data store (e.g., data store 730).

The sorter component 724 can sort motion vector values associated with neighboring motion vectors of a current macroblock in a desired order (e.g., ascending order) using a sorting algorithm (e.g., insertion sort algorithm) to facilitate calculating a dissimilarity level d associated with the current macroblock. The sorter component 724 can sort motion vector values, for example, by row and column of the macroblock grid of the visual image.

In some implementations, the encoder component 102 can contain a resource controller component 726 that can allocate (e.g., dynamically or automatically) resources, including processing resources (e.g., one or more processors) associated with the encoder component 700, to the coder component 710, estimator component 712, or other components, based at least in part on one or more defined coding criterion. For example, the resource controller component 726 can dynamically identify an amount of processing resources to allocate to the estimator component 712 to perform motion estimation on a visual image as a function of whether the estimator component 712 identifies a parent macroblock, associated with the visual image (e.g., a down-sampled visual image associated with an original image), as intra mode or inter mode.

In some implementations, the encoder component 700 also can include a processor component 728 that can operate in conjunction with the other components (e.g., communicator component 702, aggregator component 704, analyzer component 706, etc.) to facilitate performing the various functions of the encoder component 700. The processor component 728 can employ one or more processors, microprocessors, or controllers that can process data, such as information relating to encoding data, information relating to other operations of the encoder component 700, and/or other information, etc., to facilitate encoding video content and/or performing other operations associated with the encoder component 700, as more fully disclosed herein. The processor component 728 can control data flow between the encoder component 700 and other components (e.g., media source, media capture device, decoder component, data store, computer-readable storage media, etc.) associated with the encoder component 700.

The encoder component 700 also can include a data store 730 that can store data structures (e.g., user data, video content, metadata), instructions, procedures, and/or code structure(s) (e.g., modules, objects, hashes, classes) to facilitate performing or controlling operations associated with the encoder component 700. The data store 730 also can store information (e.g., encoding-related algorithms including the fast motion estimation algorithm, encoding parameters, encoding criterion(s), etc.) relating to encoding data, and/or information relating to other operations of the encoder component 700, etc., to facilitate encoding video content, and performing or controlling operations, associated with the encoder component 700. The processor component 728 can be coupled (e.g., through a memory bus) to the data store 730 in order to store and retrieve information desired to operate and/or confer functionality, at least in part, to the components (e.g., communicator component 702, aggregator component 704, analyzer component 706, etc.) of the encoder component 700, and/or substantially any other operational aspects of the encoder component 700.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

While implementations and aspects of this disclosure are described herein with regard to macroblocks, this disclosure is not so limited. For example, the implementations and aspects disclosed herein in relation to macroblocks can be used (e.g., applied) in relation to various types of units or regions of a video frame, such as, for example, blocks, sub-macroblocks, coding units, motion granularity units, partitions, and/or other types of image compression units, and these various types of image compression units are within the scope of this disclosure. The size of a macroblock can be, for example, M×M pixels or M×N pixels, where M can be virtually any desired integer value and N can be virtually any desired integer value that can be different from M.

Figure 8:
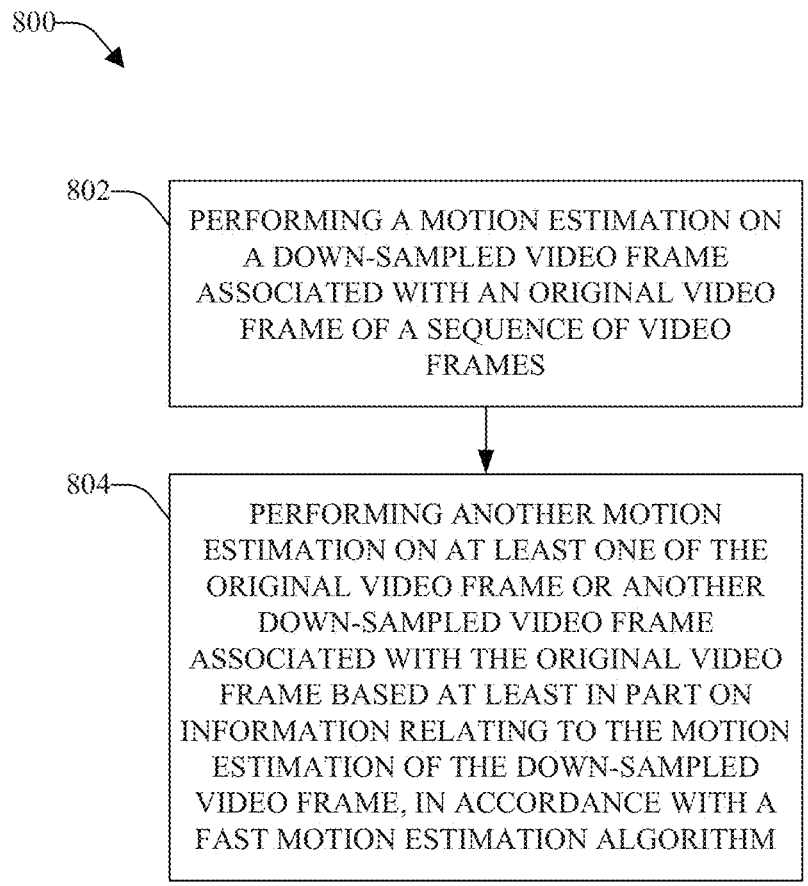
FIG. 8 illustrates a flow chart of an example method for encoding video frames of a video frame sequence, in accordance with various aspects and implementations of this disclosure.
Figure 9:
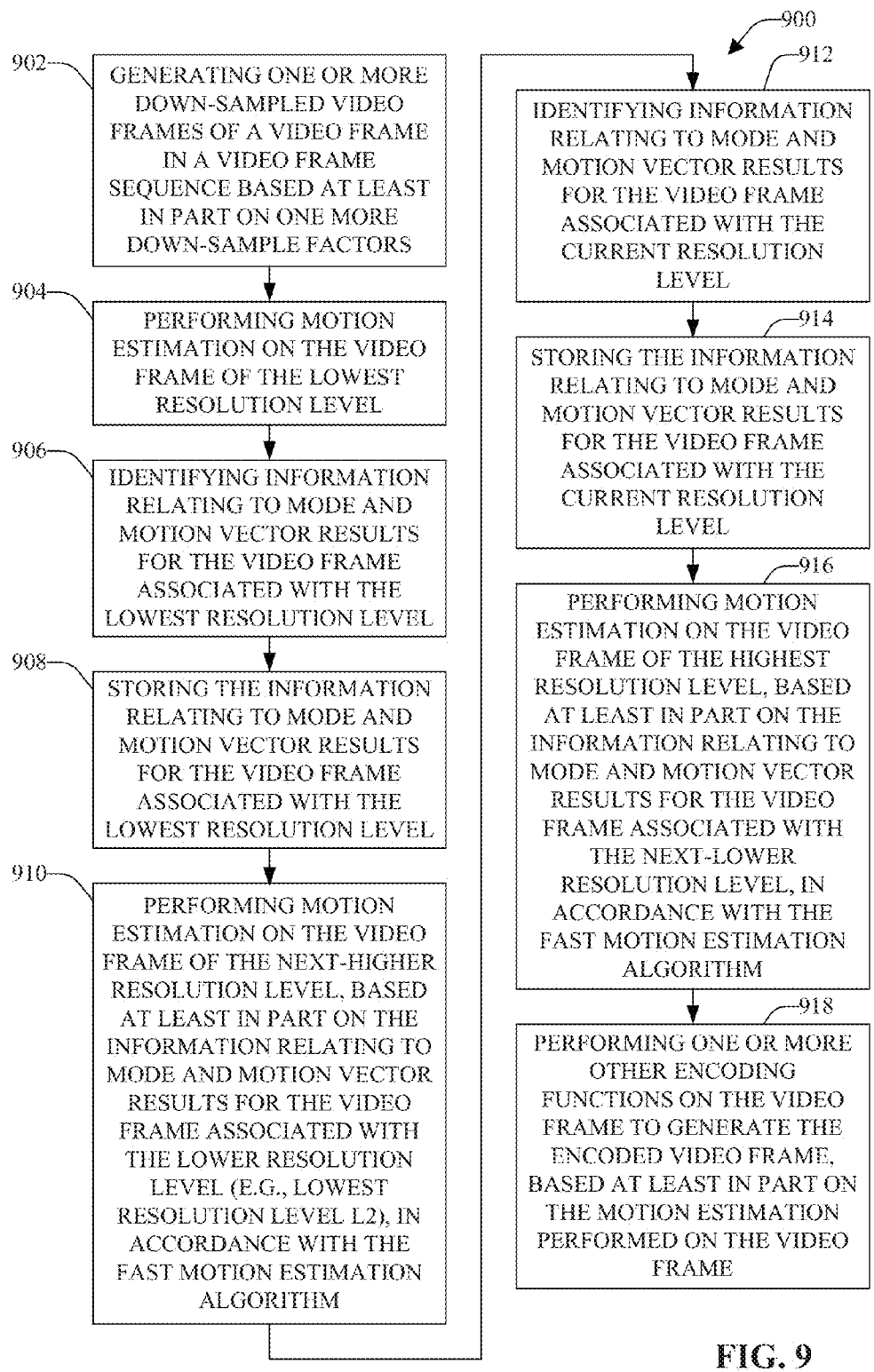
FIG. 9 illustrates a flow chart of an example method for encoding video frames of a video frame sequence, in accordance with various aspects and implementations.
Figure 10:
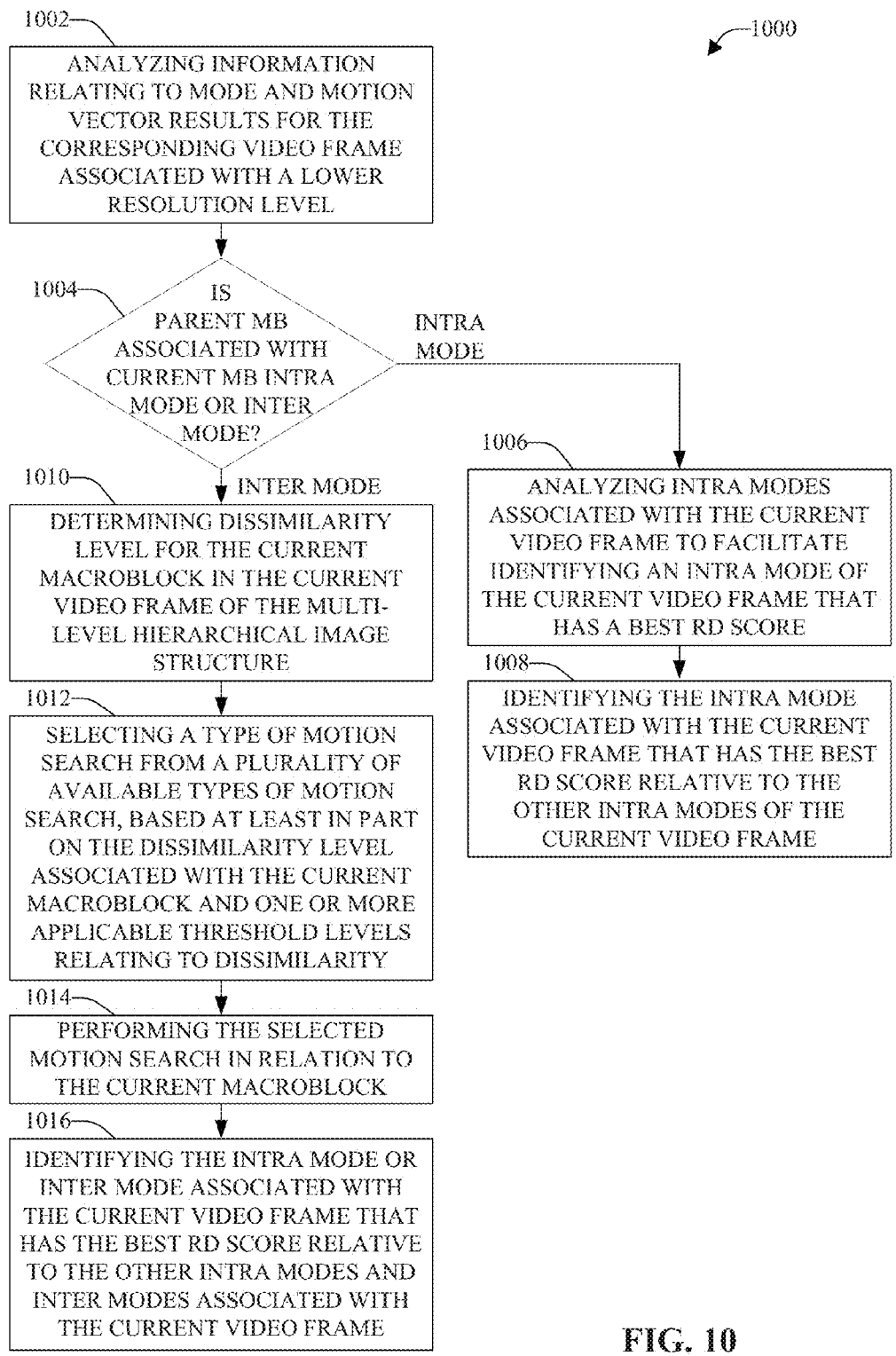
FIG. 10 is a flow diagram of an example method for analyzing information relating motion estimation of a video frame of a lower-resolution level of a multi-level hierarchical image structure to facilitate performing motion estimation on a current video frame of a next-higher resolution level of the multi-level hierarchical image structure, in accordance with various aspects and implementations.

In view of the example systems, components, and devices described above, example methods that can be implemented in accordance with this disclosure can be further appreciated with reference to flowcharts in FIGS. 8-10. For purposes of simplicity of explanation, various methods disclosed herein are presented and described as a series of acts; however, it is to be understood and appreciated that this disclosure is not limited by the order of acts, as some acts may occur in different order and/or concurrently with other acts from that shown and described herein. It is noted that not all illustrated acts may be required to implement a described method in accordance with this disclosure. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

FIG. 8 illustrates a flow chart of an example method 800 for encoding video frames of a video frame sequence, in accordance with various aspects and implementations of this disclosure. At 802, a motion estimation can be performed on a down-sampled video frame associated with an original video frame of a sequence of video frames. The encoder component can perform the motion estimation on the down-sampled video frame. The down-sampled video frame can be part of a multi-level image structure that can include two or more resolution levels. For example, the multi-level image structure can include the original video frame (e.g., image 204), a first down-sampled video frame (e.g., first down-sampled image 206), and/or a second down-sampled video frame (e.g., second down-sampled image 208). The encoder component can perform respective motion estimations on the respective images of the multi-level image structure starting from the lowest resolution level to the highest resolution level of the multi-level image structure, in accordance with a specified motion estimation algorithm, based at least in part on the resolution level of an image in relation to the multi-level image structure. For example, if an image is at the lowest resolution level (e.g., image 208), the encoder component can perform a motion estimation on that image using a regular motion estimation algorithm (e.g., a block-based motion algorithm). As another example, if an image is at a resolution level that is higher than the lowest resolution level (e.g., image 206 or image 208), the encoder component can perform a motion estimation on such image using a fast motion estimation algorithm, as more fully disclosed herein.

At 804, another motion estimation can be performed on at least one of the original video frame or another down-sampled video frame associated with the original video frame based at least in part on information relating to the motion estimation of the down-sampled video frame, in accordance with a fast motion estimation algorithm. The encoder component can perform another motion estimation on a video frame (e.g., first down-sampled image 206 or original image 204) associated with a resolution level that is next highest in the multi-level image structure than the resolution level associated with the down-sampled video frame (e.g., second down-sampled image 208) on which motion estimation was performed during act 802. The encoder component, using an estimator component, can propagate information relating to the motion estimation of the down-sampled video frame to the next higher resolution level for use in performing motion estimation on the other video frame associated with the next higher resolution level. The information relating to the motion estimation of the down-sampled video frame can include, for example, mode selection and motion vector results associated with the motion estimation performed at act 802. The encoder component can use one or more rules, as described herein, to facilitate performing the motion estimation on the other down-sampled video frame or original video frame, in accordance with the fast motion estimation algorithm. If there are more than two resolution levels, the encoder component can continue to propagate information relating to motion estimations of a lower resolution level to a next higher resolution level to facilitate performing motion estimations on video frames of a next higher resolution level(s) up through performing a motion estimation on the original video frame.

FIG. 9 depicts a flow chart of an example method 900 for encoding video frames of a video frame sequence, in accordance with various aspects and implementations of this disclosure. At 902, one or more down-sampled video frames of a video frame in a video frame sequence can be generated (e.g., using an estimator component of the encoder component) based at least in part on one more down-sample factors. The down-sampled video frames can be associated with different resolution levels of a multi-level hierarchical or pyramid image structure, based at least in part on the respective down-sample factors of the respective video frames. The original video frame (e.g., image 204) and the down-sampled video frames (e.g., image 206 and/or image 208) can form a multi-level hierarchical or pyramid image structure, with the original video frame having the highest resolution and being at the top of the structure, and the lowest resolution video frame being at the bottom of the structure. In accordance with various implementations, no mid-level frames, or one or more mid-level video frames can be in between the original video frame and lowest-level video frame in the structure, as desired. With regard to method 900, for simplicity of description, one mid-level video frame is included in the structure. A mid-level video frame can have a higher resolution than the lowest-level video frame, but a lower resolution than the original, highest-level video frame.

At 904, motion estimation can be performed (e.g., by the estimator component) on the video frame (e.g., image 208) of the lowest resolution level (e.g., L2). At 906, information relating to mode and motion vector results for the video frame associated with the lowest resolution level can be identified (e.g., by the estimator component). At 908, the information relating to mode and motion vector results for the video frame associated with the lowest resolution level can be stored (e.g., in a data store 108 by the estimator component 104).

At 910, motion estimation can be performed (e.g., by the estimator component) on the video frame (e.g., image 206) of the next-higher resolution level (e.g., L1), based at least in part on the information relating to mode and motion vector results for the video frame associated with the lower resolution level (e.g., lowest resolution level, L2), in accordance with the fast motion estimation algorithm. In some implementations, in addition to using motion estimation results from an image (e.g., image 208) associated with a lower-resolution level (e.g., L2) when performing motion estimation on an image (e.g., image 206) of a next-higher resolution level (e.g., L1), the estimator component can use spatial information associated with the image (e.g., image 206) of the current higher-resolution level (e.g., L1) to facilitate performing motion estimation on the current image (e.g., image 206). The estimator component can use the spatial information, for example, to facilitate prediction of motion vectors based at least in part on the previously encoded area in the current video frame (e.g., image 206), in accordance with the fast motion estimation algorithm. In relation to a current macroblock of the current video frame, the previously encoded area can include, for example, a macroblock (e.g., left macroblock) to the left of the current macroblock in the frame, a macroblock (e.g., above macroblock) that is above the current macroblock in the frame, and/or a macroblock (e.g., above-left macroblock) that is above and to the left of the current macroblock in the frame. The estimator component can calculate a motion vector predictor (e.g., child_mvp) for the current macroblock of the current video frame.

At 912, information relating to mode and motion vector results for the video frame (e.g., image 206) associated with the current resolution level (e.g., L1) can be identified (e.g., by the estimator component). At 914, the information relating to mode and motion vector results for the video frame associated with the video frame of the current resolution level (e.g., L1) can be stored (e.g., in the data store 108 by the estimator component 104).

At 916, motion estimation can be performed (e.g., by the estimator component) on the video frame (e.g., original image 204) of the highest resolution level (e.g., L0), based at least in part on the information relating to mode and motion vector results for the video frame (e.g., image 206) associated with the next-lower resolution level (e.g., L1), in accordance with the fast motion estimation algorithm. In some implementations, in addition to using motion estimation results from an image (e.g., image 206) associated with a lower-resolution level (e.g., mid-resolution level L1) when performing motion estimation on the image (e.g., image 204) of the highest resolution level (e.g., L0), the estimator component can use spatial information associated with the image (e.g., image 204) of the highest-resolution level (e.g., L0) to facilitate performing motion estimation on the current image (e.g., image 204). The estimator component can use the spatial information, for example, to facilitate prediction of motion vectors based at least in part on the previously encoded area in the current video frame (e.g., image 204), in accordance with the fast motion estimation algorithm. In relation to a current macroblock of the current video frame (e.g., image 204), the previously encoded area can include, for example, a macroblock (e.g., left macroblock) to the left of the current macroblock in the frame, a macroblock (e.g., above macroblock) that is above the current macroblock in the frame, and/or a macroblock (e.g., above-left macroblock) that is above and to the left of the current macroblock in the frame. The estimator component can calculate a motion vector predictor (e.g., child_mvp) for the current macroblock of the current video frame.

At 918, one or more other encoding functions can be performed (e.g., by the encoder component 102 and/or coder component 106) on the video frame (e.g., original image 204) to generate the encoded video frame, based at least in part on the motion estimation performed on the video frame, in accordance with the fast motion estimation algorithm and/or another encoding-related algorithm.

Referring next to FIG. 10, depicted is a flow chart of an example a method 1000 for analyzing information relating motion estimation of a video frame of a lower-resolution level of a multi-level hierarchical image structure to facilitate performing motion estimation on a current video frame of a next-higher resolution level of the multi-level hierarchical image structure, in accordance with various aspects and implementations. At 1002, information relating to mode and motion vector results for the corresponding video frame (e.g., down-sampled video frame) associated with a lower resolution level can be analyzed. For instance, when performing motion estimation of a current video frame (e.g., first down-sampled image 206) of a next-higher resolution level (e.g., L1), the estimator component can analyze information relating to mode and motion vector results for a corresponding down-sampled video frame (e.g., image 208) associated with a lower resolution level (e.g., L2) of the structure, in accordance with the fast motion estimation algorithm.

At 1004, a determination can be made regarding whether a parent macroblock of a lower-resolution level video frame (e.g., image 208) associated with the current macroblock of the current video frame (e.g., image 206) is intra mode or inter mode. The estimator component can determine whether the parent macroblock associated with the current macroblock of the current video frame of the multi-level hierarchical image structure is intra mode or inter mode. The parent macroblock of the current macroblock of the current video frame can be the macroblock in the corresponding lower-resolution video frame (e.g., second down-sampled image 208) that corresponds to the current macroblock in the current video frame. The estimator component can identify the current macroblock (e.g., child macroblock of the parent macroblock) as intra mode if the parent macroblock is intra mode, and identify that the current macroblock can be intra or inter mode if the parent macroblock is inter mode.

If it is determined that the parent macroblock (and thus the current macroblock) of the current video frame is intra mode, at 1006, intra modes associated with the current video frame can be analyzed (e.g., by the estimator component) to facilitate identifying an intra mode of the current video frame that has a best rate-distortion (RD) score (e.g., the intra mode with the least RD error) relative to the other intra modes of the current video frame. At 1008, the intra mode associated with the current video frame that has the best RD score relative to the other intra modes of the current video frame can be identified. The estimator component can identify and select the intra mode associated with the current video frame that has the best RD score relative to the other intra modes of the current video frame for use in facilitating performing motion estimation on the current video frame.

Referring again to reference numeral 1004, at 1004, if it is determined that the parent macroblock is inter mode (and thus the current macroblock can be inter mode or intra mode), at 1010, a dissimilarity level d can be determined or calculated (e.g., by the estimator component) for the current macroblock in the current video frame of the multi-level hierarchical image structure. At 1012, a type of motion search can be selected from a plurality of available types of motion search (e.g., by the estimator component), based at least in part on the dissimilarity level associated with the current macroblock and one or more applicable threshold levels relating to dissimilarity, in accordance with the fast motion estimation algorithm. The available types of motion search methods can include, for example, a motion search of a parent reference frame, a center-biased motion search method, or an n-step motion search or other comprehensive motion search method. The estimator component can identify and select a motion search method to implement in relation to the current macroblock, based at least in part on the dissimilarity level associated with the current macroblock in relation to the one or more applicable threshold levels relating to dissimilarity, in accordance with the fast motion estimation algorithm and the defined coding criterion, as more fully described herein.

At 1014, the selected motion search can be performed in relation to the current macroblock. The estimator component can perform a motion search using the selected motion search method to analyze the intra modes and inter modes associated with the current video frame and/or a reference video frame(s) associated with the current video frame to facilitate identifying the intra mode or inter mode having the best RD score relative to the other intra modes or inter modes.

At 1016, the intra mode or inter mode associated with the current video frame that has the best RD score relative to the other intra modes and inter modes associated with the current video frame can be identified. Based at least in part on the motion search, the estimator component can identify the intra mode or inter mode associated with the current video frame that has the best RD score relative to the other intra modes and inter modes associated with the current video frame. The estimator component can use the identified intra mode or inter mode to facilitate performing motion estimation on the current video frame.

Figure 11:
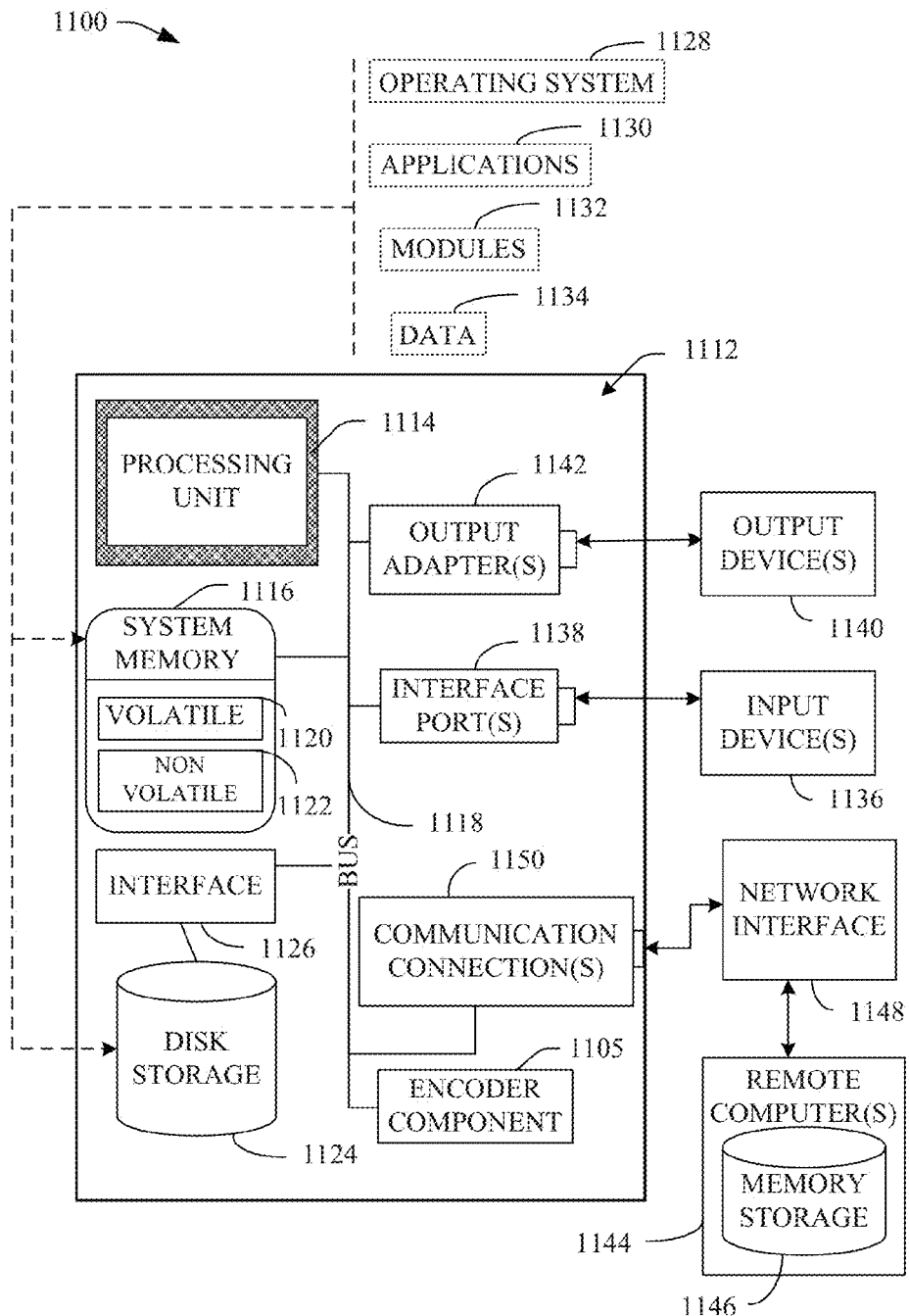
FIG. 11 is a schematic block diagram illustrating a suitable operating environment.
Figure 12:
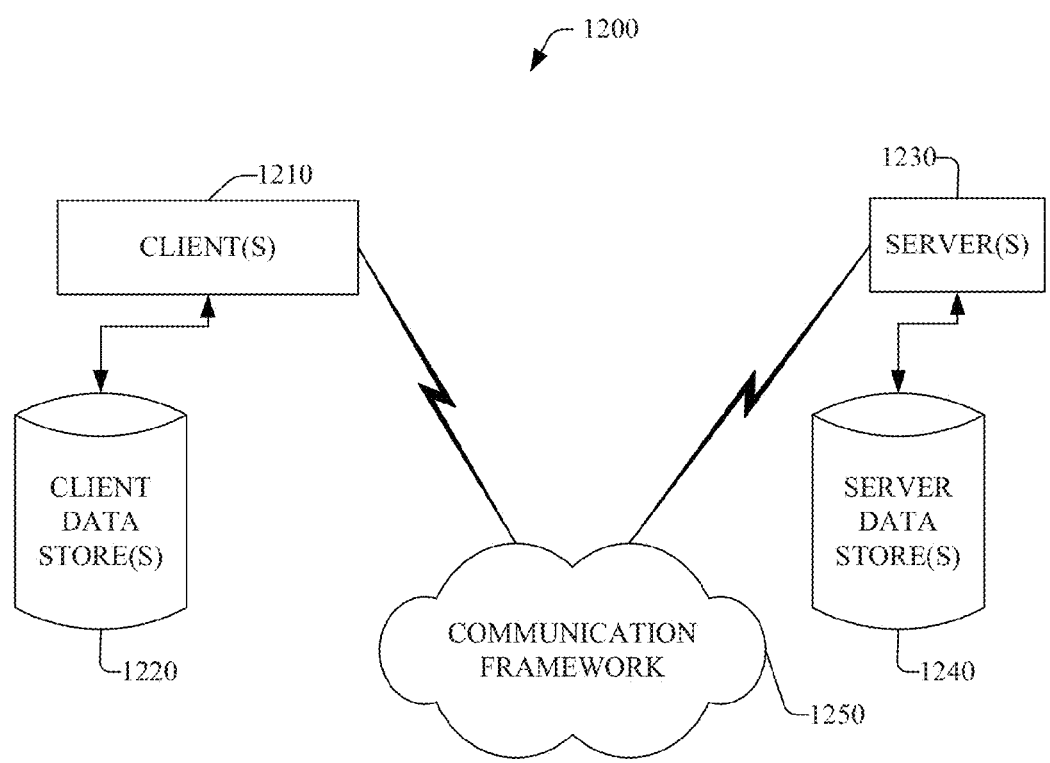
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multi-processor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored, e.g., in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

In accordance with various aspects and implementations, the computer 1112 can be used to encode data, such as digital media data, which can be in the form of a sequence of video frames (e.g., raw video frames). As more fully disclosed herein, in some implementations, the computer 1112 can include one or more processors (e.g., processing unit 1114) that can be used to process data, including processing data to perform various encoding tasks. In certain implementations, the computer can include an encoder component 1105 (e.g., encoder, codec that can include an encoder and decoder) that can be associated with the one or more processors to perform the various encoding tasks. The encoder component 1105 can include, for example, an estimator component, coder component, and/or other components (e.g., resource controller component to control allocation of processing resources between the estimator component, coder component, and/or other components of the encoder component 1105). The encoding tasks can include generating down-sampled copies of an original video frame to form a multi-level, multi-resolution hierarchical structure that can include the original video frame and corresponding down-sampled video frames. The encoding tasks also can include generating or performing motion estimation using, for example, a fast motion estimation algorithm and/or other motion estimation algorithm, and/or determining or calculating dissimilarity level associated with a macroblock of a video frame. The encoding tasks further can include propagating motion estimation results from a lower resolution level to a higher resolution level for use in performing motion estimation on the higher resolution level. The encoder component, operating in conjunction with the one or more processors, can perform the various encoding tasks on data sequentially or in parallel.

FIG. 12 is a schematic block diagram of a sample-computing environment 1200 (e.g., computing system) with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be appreciated and understood that components (e.g., encoder component, estimator component, coder component, etc.), as described with regard to a particular system or method, can include the same or similar functionality as respective components (e.g., respectively named components or similarly named components) as described with regard to other systems or methods disclosed herein.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system to facilitate encoding of an original video frame of a video frame sequence, comprising:
   at least one memory that stores computer executable components; and
   at least one processor that executes the following computer executable components stored in the at least one memory:
      an estimator component configured to:
         generate a first motion estimation for a first down-sampled video frame associated with the original video frame,
         generate at least one other motion estimation for at least one of the original video frame or a second down-sampled video frame associated with the original video frame based at least in part on information relating to the motion estimation of the first down-sampled video frame and whether a parent macroblock associated with the first down-sampled video frame is identified as inter mode or intra mode, to facilitate the encoding of the original video frame, wherein the parent macroblock corresponds to a current macroblock of the at least one of the original video frame or the second down-sampled video frame,
         analyze the information relating to the motion estimation of the first down-sampled video frame, and identify whether the parent macroblock associated with the first down-sampled video frame is intra mode or inter mode based at least in part on results of the analysis of the information, in accordance with a fast motion estimation algorithm,
         in response to identification of the parent macroblock as intra mode, identify the current macroblock as intra mode and select a best intra mode for the current macroblock, wherein the best intra mode for the current macroblock is an intra mode having a least rate-distortion error relative to other intra modes associated with a current video frame, wherein the current macroblock is a child macroblock of a plurality of child macroblocks, and wherein the current video frame is one of the original video frame or a second down-sampled video frame; and
      a coder component configured to perform one or more encoding functions on the video frame sequence using the at least one other motion estimation or information derived from the at least one other motion estimation.

2. The system of claim 1, further comprising a scaler component configured to generate one or more down-sampled video frames, based at least in part on the original video frame, as a function of one or more down-sample factors.

3. The system of claim 1, further comprising:
   a motion estimation generator component configured to generate the first motion estimation on the first down-sampled video frame,
   wherein the first down-sampled video frame is at a lowest resolution level of a multiple-level hierarchical video structure associated with the original video frame.

4. The system of claim 3, wherein the motion estimation generator component is further configured to generate the at least one other motion estimation for the second down-sampled video frame based at least in part on the information relating to the motion estimation of the first down-sampled video frame, in accordance with a fast motion estimation algorithm, wherein the second down-sampled video frame is at a resolution level that is higher than the lowest resolution level in the multiple-level hierarchical video structure.

5. The system of claim 4, wherein the motion estimation generator component is further configured to generate the at least one other motion estimation for the original video frame, wherein the original video frame is at a resolution level that is higher than the resolution level of the second down-sampled video frame in the multiple-level hierarchical video structure, based at least in part on information relating to the motion estimation of the second down-sampled video frame, in accordance with the fast motion estimation algorithm.

6. The system of claim 4, wherein the estimator component is further configured to identify and store the information relating to the motion estimation of the first down-sampled video frame, wherein the information relating to the motion estimation of the first down-sampled video frame comprises information relating to a mode and a motion vector associated with the first down-sampled video frame.

7. The system of claim 1, further comprising a search component configured to perform one or more motion searches on macroblocks, wherein, in accordance with the fast motion estimation algorithm, in response to identification of the parent macroblock as inter mode, the estimator component is further configured to examine at least one of a subset of intra modes or a subset of inter modes in relation to a child macroblock of a plurality of child macroblocks, wherein the child macroblock is the current macroblock, and select a best mode from the at least one of the subset of intra modes or the subset of inter modes, and determine whether a motion search is to be performed in relation to the current macroblock, based at least in part on a subset of threshold dissimilarity levels; and in response to determining the motion search is to be performed in relation to the current macroblock, the search component is further configured to use a parent motion vector as a starting motion vector during the motion search.

8. A method for encoding an original video frame, comprising:

employing at least one processor to facilitate execution of code instructions retained in a memory device, the at least one processor, in response to execution of the code instructions, causing a device to perform acts comprising:

performing a first motion estimation on a first down-sampled video frame associated with the original video frame of a sequence of video frames;

analyzing information relating to the motion estimation of the first down-sampled video frame;

identifying whether the parent macroblock associated with the first down-sampled video frame is intra mode or inter mode in response to identifying the parent macroblock as intra mode, selecting a best intra mode for a child macroblock of a plurality of child macroblocks associated with the second down-sampled video frame, wherein the best intra mode is an intra mode having a least rate-distortion error level as compared to one or more other intra modes, and wherein the child macroblock is the current macroblock; and performing at least one other motion estimation on at least one of the original video frame or a second down-sampled video frame associated with the original video frame based at least in part on the information relating to the motion estimation of the first down-sampled video frame and whether a parent macroblock associated with the first down-sampled video frame is inter mode or intra mode, wherein the parent macroblock corresponds to a current macroblock that is associated with the at least one of the original video frame or the second down-sampled video frame.

9. The method of claim 8, comprising:

generating one or more down-sampled video frames of the original video frame in the sequence of video frames, based at least in part on one or more down-sample factors.

10. The method of claim 8, comprising:

performing the first motion estimation on the first down-sampled video frame, wherein the first down-sampled video frame is at a lowest resolution level of a multiple-level hierarchical video structure associated with the original video frame.

11. The method of claim 10, comprising:

performing the at least one other motion estimation on the second down-sampled video frame, wherein the second down-sampled video frame is at a resolution level that is higher than the lowest resolution level in the multiple-level hierarchical video structure, based at least in part on the information relating to the motion estimation of the first down-sampled video frame, in accordance with a fast motion estimation algorithm.

12. The method of claim 11, comprising:

performing the at least one other motion estimation on the second down-sampled video frame based at least in part on the information relating to the motion estimation of the first down-sampled video frame and spatial information associated with a subset of previously encoded macroblocks of the current video frame, in accordance with a fast motion estimation algorithm.

13. The method of claim 11, comprising:

performing the at least one other motion estimation on the original video frame, wherein the original video frame is at a resolution level that is higher than the resolution level of the second down-sampled video frame in the multiple-level hierarchical video structure, based at least in part on information relating to the motion estimation of the second down-sampled video frame, in accordance with a fast motion estimation algorithm.

14. The method of claim 11, comprising:

identifying the information relating to the motion estimation of the first down-sampled video frame, the information comprising information relating mode and motion vector results associated with motion estimation performed on the first down-sampled video frame; and storing the information relating to the motion estimation of the first down-sampled video frame.

15. The method of claim 11, comprising:

generating a macroblock mapping between the lowest resolution level associated with the first down-sampled video frame and the resolution level associated with the second down-sampled video frame, based at least in part on a down-sampling factor between the first down-sampled video frame and the second down-sampled video frame.

16. The method of claim 8, comprising:

in response to identifying the parent macroblock as inter mode, analyzing a subset of inter modes and a subset of intra modes associated with the current macroblock, determining whether a motion search is to be performed in relation to the current macroblock, using a parent motion vector as a starting motion vector in relation to performing the motion search in relation to the current macroblock in response to determining the motion search is to be performed, and selecting a best mode of the subset of intra modes or the subset of inter modes for the child macroblock.

17. The method of claim 16, comprising:
determining whether a dissimilarity level of the current macroblock is less than a first threshold dissimilarity level; and
in response to determining the dissimilarity level of the current macroblock is less than the first threshold dissimilarity level, performing the motion search on a parent reference frame.

18. The method of claim 16, comprising:
determining whether the dissimilarity level of the current macroblock is less than a second threshold dissimilarity level; and
in response to determining the dissimilarity level of the current macroblock is less than the second threshold dissimilarity level,
performing the motion search using a center-biased search algorithm, and
adjusting a search range in accordance with the dissimilarity level.

19. The method of claim 18, comprising:
in response to determining the dissimilarity level of the current macroblock is not less than the second threshold dissimilarity level,
selecting the parent motion vector as the starting motion vector;
selecting the search range to correspond to the dissimilarity level; and
performing a comprehensive motion search.

20. The method of claim 8, comprising
analyzing at least the information relating to the motion estimation of the first down-sampled video frame;
determining whether a dissimilarity value associated with the current macroblock is equal to zero and whether its parent motion vector equals a child motion vector predictor associated with the current macroblock; and
assigning the parent motion vector to the current macroblock and terminating a motion estimation process in response to determining the dissimilarity value associated with the current macroblock is equal to zero and the parent motion vector equals the child motion vector predictor.

21. The method of claim 8, comprising
analyzing at least the information relating to the motion estimation of the first down-sampled video frame;
determining whether a parent macroblock has a zero motion vector and a child macroblock motion vector predictor associated with the current macroblock is zero; and
assigning the zero motion vector to the current macroblock and terminating a motion estimation process in response to determining the parent macroblock has the zero motion vector and the child macroblock motion vector predictor is zero.

22. The method of claim 8, comprising
analyzing at least the information relating to the motion estimation of the first down-sampled video frame;
determining whether a parent macroblock has a zero motion vector and the current macroblock has a dissimilarity level that is less than a defined dissimilarity threshold level; and
performing a sub-pixel search in response to determining the parent macroblock has the zero motion vector and the dissimilarity level associated with the current macroblock is less than the defined dissimilarity threshold level.

23. A method comprising:
generating a first down-sampled frame from a current frame of an input video sequence;
generating coding information for a block of the first down-sampled frame;
generating, by a processor in response to instructions stored on a non-transitory computer readable medium, an encoded block for a current block from the current frame, wherein the current block corresponds spatially with at least a portion of the block of the first down-sampled frame, wherein encoding the current block includes determining a coding mode for the current block based on a coding mode for the block of the first down-sampled frame, wherein determining the coding mode for the current block includes:
on a condition that the coding mode for the block of the first down-sampled frame is an intra-coding mode, identifying an intra-coding mode for encoding the current block, and
on a condition that the coding mode for the block of the first down-sampled frame is an inter-coding mode, identifying a coding mode for encoding the current block, wherein identifying the coding mode includes:
determining whether to encode the current block using inter-coding or intra-coding; and
on a condition that the coding mode for the current block is an inter-coding mode, generating coding information for the current block based on the coding information for the block of the first down-sampled frame;
including the encoded block in an output bitstream; and
transmitting or storing the output bitstream.

24. The method of claim 23, wherein generating coding information for the current block includes motion searching a reference frame, wherein motion searching the reference frame includes identifying the reference frame, wherein identifying the reference frame includes:
using a reference frame identified by the coding information for the block of the first down-sampled frame, on a condition that a dissimilarity value for the block of the first down-sampled frame is within a first dissimilarity threshold; and
using a reference frame selected from the plurality of reference frames, on a condition that the dissimilarity value for the block of the first down-sampled frame exceeds the first dissimilarity threshold.

25. The method of claim 24, wherein motion searching the reference frame includes:
using a comprehensive motion search, on a condition that the dissimilarity value for the block of the first down-sampled frame exceeds a second dissimilarity threshold; and
determining a reduced search range based on the dissimilarity value, on a condition that the dissimilarity value for the block of the first down-sampled frame is within the second dissimilarity threshold, wherein determining the reduced search range includes:
using a small search range, on a condition that the dissimilarity value is a small dissimilarity value;
using a large search range, on a condition that the dissimilarity value is a large dissimilarity value; and
using a moderate search range, on a condition that the dissimilarity value is a moderate dissimilarity value, wherein the large search range includes the moderate search range, the moderate search range includes the small search range, the large dissimilarity value is larger than the moderate dissimilarity value, and the moderate dissimilarity value is larger than the small dissimilarity value.

26. The method of claim 25, wherein the small dissimilarity value is less than 33, the small search range has a size of 8, the moderate dissimilarity value is greater than 32 and less than 129, the moderate search range has a size of 16, the large dissimilarity value is greater than 128, and the large search area has a size of 24.

27. The method of claim 25, wherein generating coding information for the current block includes:

using the motion vector from the coding information for the block of the first down-sampled frame as the motion vector for the current block, on a condition that the dissimilarity value is 0 and the motion vector from the coding information for the block of the first down-sampled frame equals a predicted motion vector for the current block;

using a zero motion vector as the motion vector for the current block, on a condition that the motion vector from the coding information for the block of the first down-sampled frame is a zero motion vector, and a predicted motion vector for the current block is a zero motion vector;

full-pixel motion searching, on a condition that the motion vector from the coding information for the block of the first down-sampled frame is a zero motion vector, and the dissimilarity value exceeds a third dissimilarity threshold; and sub-pixel motion searching, on a condition that the motion vector from the coding information for the block of the first down-sampled frame is a zero motion vector, and the dissimilarity value is within the third dissimilarity threshold.

* * * * *